(12) United States Patent
Schubert et al.

(10) Patent No.: US 6,996,200 B2
(45) Date of Patent: Feb. 7, 2006

(54) DEVICE FOR USE IN CONTROLLING A SAMPLE RATE

(75) Inventors: Richard Schubert, Medfield, MA (US); James Wilson, Foxboro, MA (US); Colm Prendergast, Cambridge, MA (US)

(73) Assignee: Analog Devices, Inc., Norwood, MA (US)

( * ) Notice: Subject to any disclaimer, the term of this patent is extended or adjusted under 35 U.S.C. 154(b) by 816 days.

(21) Appl. No.: 09/748,700

(22) Filed: Dec. 22, 2000

(65) Prior Publication Data

US 2001/0033628 A1 Oct. 25, 2001

Related U.S. Application Data

(60) Provisional application No. 60/172,024, filed on Dec. 23, 1999, and provisional application No. 60/183,107, filed on Feb. 17, 2000.

(51) Int. Cl.
*H04L 7/00* (2006.01)

(52) U.S. Cl. ....................................................... 375/355
(58) Field of Classification Search ................ 375/355, 375/354, 373, 376, 316, 327, 222, 377; 341/61, 341/143; 348/469, 473
See application file for complete search history.

(56) References Cited

U.S. PATENT DOCUMENTS

| 5,313,205 | A | | 5/1994 | Wilson et al. |
| 5,353,026 | A | | 10/1994 | Wilson et al. |
| 5,485,152 | A | | 1/1996 | Wilson et al. |
| 5,489,903 | A | | 2/1996 | Wilson et al. |
| 5,497,152 | A | | 3/1996 | Wilson et al. |
| 5,512,897 | A | | 4/1996 | Wilson et al. |
| 5,528,240 | A | | 6/1996 | Wilson et al. |
| 5,552,785 | A | | 9/1996 | Wilson et al. |
| 5,574,454 | A | | 11/1996 | Wilson et al. |
| 5,600,320 | A | | 2/1997 | Wilson et al. |
| 5,619,720 | A | | 4/1997 | Garde et al. |
| 5,621,478 | A | * | 4/1997 | Demmer ..................... 348/639 |
| 5,625,358 | A | | 4/1997 | Wilson et al. |
| 5,625,359 | A | | 4/1997 | Wilson et al. |
| 5,638,010 | A | * | 6/1997 | Adams ........................ 327/105 |
| 5,712,635 | A | | 1/1998 | Wilson et al. |
| 5,784,378 | A | | 7/1998 | Murray et al. |
| 5,786,778 | A | * | 7/1998 | Adams et al. ................ 341/61 |
| 5,809,432 | A | | 9/1998 | Yamashita ................... 455/575 |
| 5,844,629 | A | | 12/1998 | Murray et al. |
| 5,892,468 | A | | 4/1999 | Wilson et al. |

(Continued)

FOREIGN PATENT DOCUMENTS

| EP | 0 948 133 A2 | 10/1999 |
| WO | WO 98/53634 | 11/1998 |

OTHER PUBLICATIONS

Chang et al., "A CMOS Analog Front–End Circuit for an FDM–Based ADSL System", IEEE Journal of Solid–State Circuits, vol. 30, (1995) Dec., No. 12, New York, U.S.A., pp. 1449–1455.

*Primary Examiner*—Khai Tran
(74) *Attorney, Agent, or Firm*—Wolf, Greenfield & Sacks, P.C.

(57) ABSTRACT

A first device comprises a loop circuit to control a sample rate of a digital circuit element. A circuit comprises a digital loop circuit to control a sample rate of a digital circuit element to be a function of a frequency of a signal received by the circuit. A second device receives two or more sampled data streams having sample rates different from one another, converts the sample rate of one or more of the data streams to provide two or more data streams having sample rates compatible with one another, and combines the two data streams. Sample rate converter devices are used in a PLL and a clock recovery circuit.

12 Claims, 32 Drawing Sheets

U.S. PATENT DOCUMENTS

| | | | |
|---|---|---|---|
| 5,894,557 A | 4/1999 | Bade et al. | 395/200.58 |
| 5,963,160 A | 10/1999 | Wilson et al. | |
| 5,987,484 A | 11/1999 | Sherry et al. | |
| 6,040,793 A | 3/2000 | Ferguson, Jr. et al. | |
| 6,049,302 A * | 4/2000 | Hinckley, Jr. | 342/99 |
| 6,163,685 A * | 12/2000 | Dilling et al. | 455/247.1 |
| 6,393,070 B1 * | 5/2002 | Reber | 375/340 |
| 6,487,672 B1 * | 11/2002 | Byrne et al. | 713/400 |

\* cited by examiner

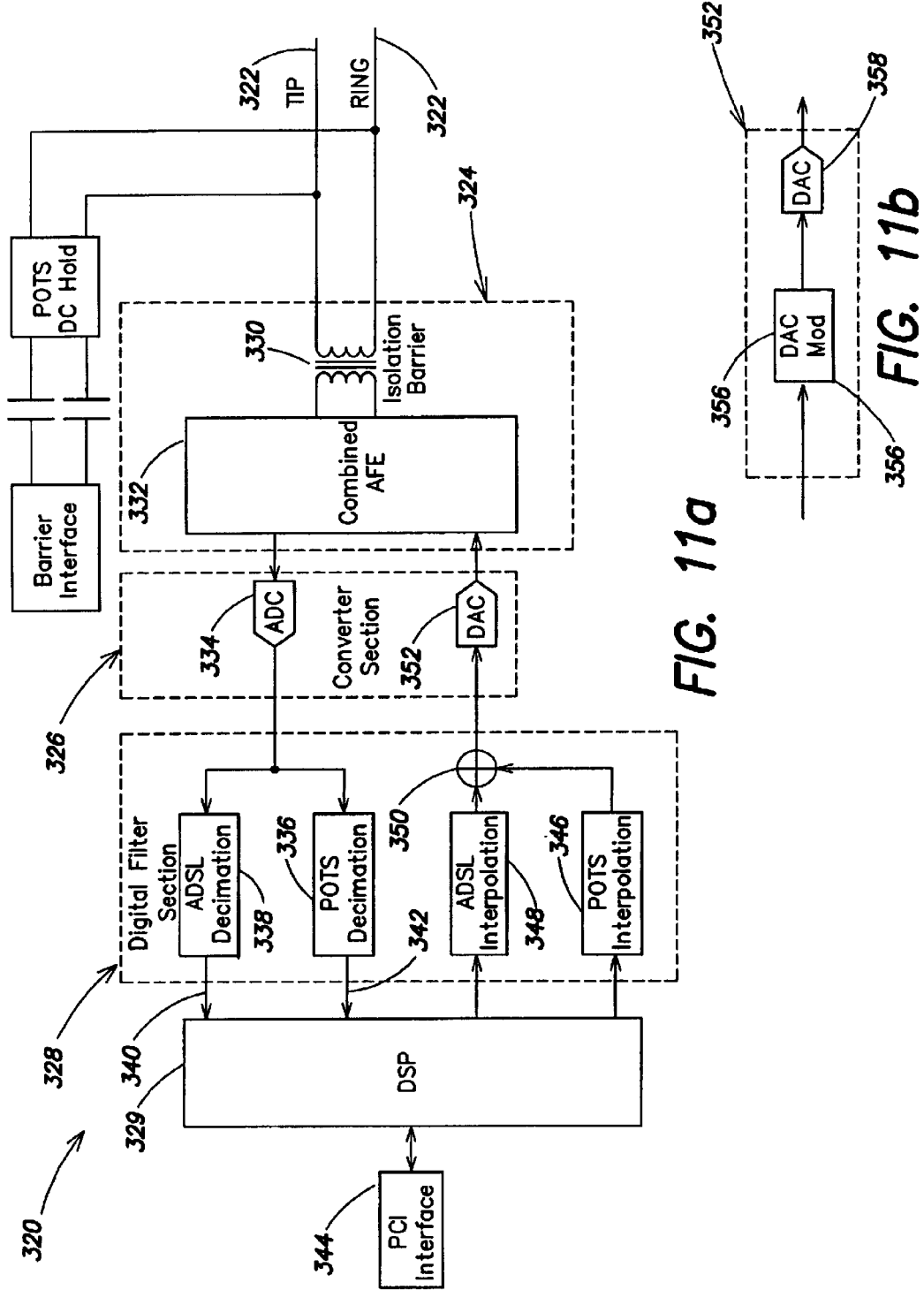

*DAA∴Direct Access Arrangement

DEVICE FOR USE IN CONTROLLING A SAMPLE RATE

PRIORITY CLAIM

This application claims priority, under 35 U.S.C. section 119 (e), of U.S. Provisional Application No. 60/172,024, filed on Dec. 23, 1999 entitled "Multiple Protocol Telephony Device" and U.S. Provisional Application No. 60/183,107, filed on Feb. 17, 2000 entitled "Isolated Analog Communications Interface".

TECHNICAL FIELD

This invention relates to digital systems, and more particularly to devices for use in controlling a sample rate.

BACKGROUND

Communication systems are used to transfer information, for example between a source and a destination, via a communication link, or transmission channels. There are many different types of communication links, for example, wired (e.g., conductors, fiber optic cables) or wireless (e.g., microwave links, satellite links,), and combinations thereof, each of which may be public or private, dedicated, and/or shared, e.g., a network.

The are a variety of types of information that may be sought to be transferred, for example, sounds, images, and combinations thereof just to name a few.

Information to be transferred by the communication system may be converted, prior to transmission, to a form that is adapted to transmission over a transmission channel. For example, sounds and images may be converted into signals, e.g., electrical, electromagnetic, and/or optical signals, depending on the characteristics of the transmission channel.

Converting information into a signal that is to be transmitted may involve use of a standard or a protocol. For example, a signal that is to be transmitted by way of a phone line may be generated according to a plain old telephone system (POTS) standard. Alternatively, such a signal may be generated according to other standards including but not limited to emerging digital subscriber line (xDSL) standards including DSL, HDSL, HDSL2, VDSL, asymmetrical digital subscriber line (ADSL), and symmetrical ADSL. Yet another standard is integrated services digital network (ISDN).

Standards or protocols may also be used for television signals, which for example, may be broadcast via radio waves or transmitted via a coaxial cable (cable television). A television signal may, for example, be generated according to a standard definition television (SDTV) standard or a high definition television (HDTV) standard. In addition, a television signal may comprise a video component and an audio component.

Although not a requirement, each standard may make use of, or occupy, a particular signal frequency band or spectrum. For example, typical voiceband activity on phone lines in accordance with POTS standards typically occupy the 0 to 4 kiloHertz (KHz) frequency band. Present day analog modems (V0.34, V0.90 etc) also use the 0 to 4 KHz frequency band. FIG. 1 shows a representation of a signal frequency spectrum of POTS 40. Higher capacity digital communications standards may use greater bandwidths than that of POTS. Examples of such higher capacity digital communication standards include but are not limited to ISDN (integrated services digital network), which uses 0 to 80 kHz, and emerging digital subscriber line (xDSL) standards. Present variations of DSL include DSL (160 kbits/sec, full-duplex), and HDSL (900 kbits/sec, full-duplex). In development are the HDSL2 (1.8 Mbits/sec, full-duplex) and VDSL (13–52 Mbits/sec, full duplex) standards. In asymmetrical digital subscriber line (ADSL) systems, the upstream rate to the central office (CO) is different than the downstream rate to the subscriber line, e.g., 384 kbits/sec to 640 kbits/sec, and 1.5 Mbits/sec to 8 Mbits/sec, respectively. Television standards may use other frequency bands.

A single communication link may support multiple communication standards. For example, a phone line may carry ADSL and POTS or ISDN and ADSL. FIG. 2 shows a representation of a signal frequency spectrum of POTS 50 and signal frequency spectrum of ADSL 52.

FIG. 3 illustrates a system 90 that supports POTS and ADSL. The system includes a phone line 92 that carries a signal (tip/ring) having a POTS component and an ADSL component. The phone line 92 is connected to an analog splitter network 94. The analog splitter network 94 has a low pass filter section 96 that is coupled to a POTS signal path 98, and a high pass filter section 100 that is coupled to an ADSL signal path 102. In this instance, the low pass filter section 96 filters out the ADSL component so that the POTS signal path 98 receives only the POTS component. The high pass filter section 100 filters out the POTS component so that the ADSL signal path 102 receives the ADSL component.

The POTS signal path 98 includes an analog section 104, a converter section 106 and a digital filter section 108. The analog section 104 of the POTS signal path 98 includes an isolation barrier 110 (e.g., an isolation transformer) that ground isolates the receiver/transmitter from the phone line 92. The isolation barrier 110 has a differential connection to a POTS analog front-end (AFE) 112. After the POTS AFE 112, the POTS signal path 98 splits into a receive side and a transmit side. As to the receive side, the POTS AFE 112 outputs an analog signal this is supplied to an analog to digital converter (ADC) 114. The ADC 114 generates a sampled data stream, which is supplied to a digital filter 116, e.g., a decimation filter. The digital filter 116 outputs a sampled data stream having a lower sample rate than that out of the ADC, for example, 7 to 48 kHz. Each sample of the sampled data stream typically comprises 16 bit digital data. The sampled datastream is input to a DSP 118 which may be part of a host computer and which may process the data in executing voice (e.g. speaker phone) or modem (e.g. V0.90, V0.34, Fax etc) applications. Another interface such as PCI 120 may be used to pass data between the DSP 118 and a computer (not shown).

As to the transmit side of the POTS signal path 98, the DSP 118 provides a sampled data stream to a digital filter 122, e.g., an interpolation filter. As with the data out of the decimation filter 116, the sampled data stream into the interpolation filter 122 typically has a sample rate of 7 to 48 kHz. Each sample of the sampled data stream typically comprises 16 bit digital data. The interpolation filter 122 outputs a data stream that has higher sample rate than that out of the DSP 118. The data stream is supplied to a DAC 124. The DAC 124 converts the sampled data stream to an analog signal that is supplied to the POTS AFE 112, whereby the analog signal is coupled to the isolation barrier 110.

The ADSL signal path 102 is similar to, but separate from, the POTS signal path 98 and includes an analog section 126, a converter section 128, a digital filter section 130, which is coupled to a DSP 132. The parameters of the ADSL signal path 102 are selected in view of the ADSL spectrum. The sample rates of the DAC 124 of the ADSL signal path are typically 552 kHz, or 1.104 MHz. The sample rates of the ADC 114 of the ADSL signal path are typically 1.104 MHz or 2.208 MHz. Although shown as each having a DSP, the POTS signal path 98 and the ADSL signal path 102 may instead be fed to a single DSP.

The digital interpolation and decimation filters typically have low-pass characteristics. For example, the POTS interpolation and decimation filters 122, 116 may start to roll-off at 4 kHz. The ADSL interpolation filter 136 rolls-off at 138 kHz. The ADSL decimation filter 138 rolls-off at either 552 kHz or 1.104 MHz.

FIG. 4 illustrates a portion 150 of a communication system that supports television. The communication system includes a transmitter 152 and a receiver 154. The transmitter 152 has an analog video signal that occupies a frequency band from 0 to 4.2 mega Hertz (MHz), and an analog audio signal that occupies a frequency band from 0 to 20 kHz. The analog audio signal is supplied to an FM modulator 156 that outputs an FM modulated audio signal having a carrier frequency of 4.5 MHz. FIG. 5 is a representation of a signal frequency spectrum of the analog video signal. FIG. 6 is signal frequency spectrum of the combined RF modulated audio and video signal. The FM modulated audio signal and the analog video signal are supplied to a summer 158. A sum is supplied to an RF modulator 160, which outputs an RF modulated signal having a carrier frequency in one or more UHF and/or VHF frequency bands in accordance with the standards defined by the Federal Communication Commission for terrestrial television broadcast. The RF modulated signal, which has a video component and an audio component, is then transmitted 162.

At the receiver 154, a signal is received by an antenna 164 and supplied to an RF demodulator 166 that demodulates the signal down to a baseband signal that is a sum of the video signal component and the FM modulated audio signal component. The baseband signal is supplied to an analog splitter network 168 which has a band pass filter section 170 that is coupled to an audio signal path 172, and a low pass filter section 174 that is coupled to a video signal path 176. The band pass filter section 170 filters out the video component so that the audio signal path 172 receives only the audio component. The low pass filter section 174 filters out the audio component so that the video signal path 176 receives the video component.

The audio signal path 172 includes an FM demodulator 178 that receives the FM modulated audio signal and outputs a demodulated audio signal, which is supplied to an ADC 180. The ADC 180 generates a sampled data stream, which is supplied to a digital filter 182, that outputs a sampled data stream, which is input to a DSP 184 e.g. a host computer in a television set (not shown). The video signal path 176 includes an ADC 186, and a digital filter 188 coupled to a DSP 190. The ADC, digital filter and DSP functions are sometimes referred to as a video decoder.

FIG. 7 illustrates an analog front end (AFE) 192 for a communication system that uses a phone line. The analog front end 192 has a transmit side that includes a gain stage, which receives the analog signal from a DAC e.g. DAC 139B of the ADSL signal path 102. The gain stage outputs an amplified signal, which is supplied via a signal line to a termination impedance (Zt) 196. The termination impedance 196 is coupled to the splitter/phone line, which carries the signal to be transmitted. The electrical connections may be single ended, as shown in FIG. 7, or differential.

The termination impedance 196 helps provide line matching with the phone line to help eliminate signal path reflections that can degrade the signal on the phone line. The impedance of the phone line is frequency dependant and can vary from several kilo-Ohms at DC to 100 Ohms in the MegaHertz range. Signal protocols that occupy different frequency bands may warrant different termination impedances. A resistor (not shown) is commonly used as the termination impedance 196. For POTS, a fixed 600 Ohm value is used. For ADSL, a fixed 100 Ohms value is used. For ISDN, a fixed 120 Ohm value is used.

The analog front end 192 further includes a receive side that includes an echo cancel circuit 198, which receives the amplified signal from the gain stage 194. The output of the echo cancel circuit 198 is subtracted 197 from the phone line signal to remove most of the local transmit (Tx) signal, and the result is supplied to ADC, e.g. ADC 139A, of the ADSL signal path 102 (FIG. 3). The echo cancel circuit 198 and the subtraction 197 are sometimes combined into a hybrid network 199. This results in the ADC seeing only the receive (Rx) portion of the phone line signal. The amount of residual local Tx signal on the ADC input is dependent at least in part on how well the termination impedance 196 matches the phone line impedance.

Communication systems may require that the receiver be phase and/or frequency locked to the transmitter. In such instances, a phase locked loop (PLL) is typically used to help maintain such phase and/or frequency lock.

FIG. 8 illustrates one type of PLL. In this illustration, a voltage controlled oscillator 201B generates an output signal on line 201C. The output signal is phase/frequency locked to a reference signal on signal line 201D, as follows. A voltage controlled oscillator generates an output signal. The output signal is supplied to a phase detector 201E, which also receives the reference signal on signal line 201D. The phase detector generates a correction signal on line 201F in response to a difference in frequency/phase the between the two signals. The correction signal is filtered 201G and supplied to the voltage controlled oscillator 201B, which in response, generates the output signal.

FIG. 9 is a block diagram of a portion of the ADSL signal path of the communication system of FIG. 3, showing a prior art phase locked loop 200. In ADSL applications a single pilot tone frequency is included in the transmitted signal for the PLL to use as a reference. The PLL 200 shown in FIG. 9 includes a voltage controlled crystal oscillator (VCxO) 204 that produces a variable frequency clock, which is supplied to the ADC 139A of the ADSL signal path 102 (FIG. 3). The ADC 139A responds by producing a data stream having a variable sample rate, which is passed through the ADSL decimation filter 138 (assuming that the receiver 90 employs oversampling), which further receives the variable frequency clock from the VCxO 204 and applies fixed ratio decimation to generate a received data stream also having a variable sample rate, but divided down compared to that from the ADC 139A. The real and imaginary components of the pilot tone are extracted by an FFT function 206. The extracted components are input to a phase detector 208 that produces an up/down signal, which is passed through a digital filter 210 and DAC 212 (typically 8 to 10 bits) to generate an analog signal used to control the VCxO 204, and thereby maintain phase and/or frequency lock between the transmitter and the receiver 90. The control range of the PLL 200 is typically +/−100 parts per million (ppm). The variable frequency clock from the VCxO 204 is typically further supplied to the ADSL interpolation filter 136 (assuming that the receiver 90 employs oversampling) and the DAC 139B in the transmit side of the ADSL signal path 102.

SUMMARY

There are various shortcomings associated with the systems described above. In order to accommodate two or more signal protocols, multiple data paths, with multiple attendant hardware are required. The analog components are often large and expensive. In addition, the frequency response provided by the analog components is not easily modified without replacing components, thereby making it difficult to reconfigure the signal paths to operate with different standards (e.g. to be upgraded). The phase locked loop circuit shown in FIG. 9 requires a voltage controlled crystal oscillator (VCxO) 204, which is often relatively expensive, and a DAC 212 to control the VcxO 204. Moreover, because the frequency of the VCxO 204 is controlled by an analog loop, and the VCxO 204 is used to control the ADC 139A clock, a significant amount of phase noise is introduced, which has the effect of degrading and ultimately limiting the performance of the ADC 139A and hence the overall system.

The present invention has various aspects. One or more of the embodiments of one or more of the various aspects of the present invention may address one or more of the shortcomings discussed above. However, there is not requirement that the aspects of the invention address such shortcomings.

According to one aspect of the present invention, a device that receives and processes signals from a communication link and supports a plurality of signal protocols, comprises a digital filter that receives a single sampled data stream, wherein the device supports the at least two of the plurality of signal protocols through the digital filter.

According to another aspect of the present invention, a device that processes signals received on a communication link for supporting a plurality of signal protocols, comprises a digital filter, coupled to the communication link, that receives a single sampled data stream, and outputs at least two separate sampled data streams each having an association with a respective one of at least two of the plurality of signal protocols.

According to another aspect of the present invention, a device that receives and processes signals from a communication link and supports a plurality of signal protocols, comprises a converter, coupled to the communication link to receive a single analog input signal, wherein the device supports at least two of the plurality of signal protocols through the converter.

According to another aspect of the present invention, a device that processes signals received on a communication link for supporting a plurality of signal protocols, comprises a converter, coupled to the communication link, that outputs a single sampled data stream that is representative of at least two components each having an association with a respective one of at least two of the plurality of signal protocols.

According to another aspect of the present invention, a device that receives and processes signals from a communication link and supports a plurality of signal protocols, comprises a converter, coupled to the communication link, that receives an analog input signal indicative of a signal on the communication link and outputs a sampled data stream representative of the analog input signal, and a digital filter that receives the digital signal and outputs at least two separate digital signals each having an association with a respective one of at least two of the plurality of signal protocols.

According to another aspect of the present invention, a device that receives and processes signals from a telephone line and supports a plurality of telephone signal protocols, comprises a converter circuit that digitizes input signals received on the telephone line, and a digital filter circuit that filters the digitized input signals to separate signals associated with different protocols.

According to another aspect of the present invention, a device that receives signals from and transmits signals to a telephone line, comprises a single data transmit, data receipt, analog signal path, coupled to the telephone line, wherein the device supports multiple different telephone signal protocols through the single data transmit, data receipt, analog signal path.

According to another aspect of the present invention, a telephony device that processes signals received on a telephone line for supporting multiple different telephone line signal protocols, the device comprises a digitizer, coupled to the telephone line, that digitizes at least two of the multiple input signals received on the telephone line.

According to another aspect of the present invention, a device that receives and processes signals from a communication link that supports a plurality of signal protocols, comprises a converter, coupled to the communication link, that outputs a sampled data stream, and a digital filter that filters the sampled data stream to separate signals associated with different signal protocols.

According to another aspect of the present invention, a device receives a first input sampled data stream and a second input sampled data stream, the first input sampled data stream being representative of a signal associated with a first signal protocol, the second input sampled data stream being representative of a signal associated with a second signal protocol, and generates an output data stream in response at least to the first input sampled data stream and the second input data stream.

As stated above, one or more embodiments of the invention may solve one or more of the problems discussed above.

For example, some embodiment digitizes the entire phone line bandwidth of interest and perform all of the frequency band splitting digitally. In some of these embodiments, splitting bands digitally yields higher performance than conventional analog splitters.

Some embodiment use a single Channel (DAC/ADC/Analog Signal Path) and digitizes the entire phone line bandwidth of interest. In some of these embodiments, this allows a single Tx/Rx channel to handle multiple simultaneous phone standards i.e. POTS, ISDN, xDSL. Conventional analog channel splitters are replaced by digital band splitting. In some of these embodiments, a single DAC/ADC and analog signal path may suffice no matter how many standards are supported. In some of these embodiments, this may reduce overall system cost.

Some embodiments may be easily configured for new and different protocols.

According to another aspect of the present invention, a device coupled to a communication link which supports a plurality of signal protocols, comprises a termination impedance circuit that provides a termination impedance of the device, wherein the impedance is selectable depending on the protocol being supported.

According to another aspect of the present invention, a device comprises a termination impedance circuit, coupled to a communication link, that provides a termination impedance of the device, wherein the impedance is selectable According to another aspect of the present invention, a telephony device connected to a telephone line which supports multiple different telephone signal protocols, comprises a termination impedance circuit that provides a termination impedance of the device, wherein the impedance is selectable depending on the protocol being supported.

According to another aspect of the present invention, a device comprises an echo-cancel hybrid circuit, coupled to a communication link, that provides an echo cancel characteristic, wherein the characteristic is selectable.

According to another aspect of the present invention, a device comprises a loop circuit to control a sample rate of a digital circuit element.

According to another aspect of the present invention, a communication circuit comprises an all-digital loop circuit to control a clock rate of a digital circuit element to be a function of a frequency of a signal received by the communication circuit.

According to another aspect of the present invention, a circuit comprises a digital loop circuit to control a sample rate of a digital circuit element to be a function of a frequency of a signal received by the circuit.

According to another aspect of the present invention, a device receives two or more sampled data streams having sample rates different from one another, converts the sample rate of one or more of the data streams to provide two or more data streams having sample rates compatible with one another, and combines the two data streams.

According to another aspect of the present invention, a clock recovery circuit comprises a sample rate converter.

According to another aspect of the present invention, a phase locked loop comprises a sample rate converter.

According to another aspect of the present invention a device comprises at least one sample rate converter that receives a sampled data stream and outputs two separate data streams having output sample rates that are independent of one another.

According to another aspect of the present invention, a circuit comprises an analog to digital converter clocked at a fixed frequency, and a loop circuit that receives an output of the analog to digital converter and outputs a sample data stream having a sample rate as a function of a frequency component of a signal received by the circuit.

As stated above, one or more embodiments may address one or more of the above problems discussed above. For example, some embodiments remove the ADC from the control loop, which in some of such embodiments, may alleviate the phase noise problem associated with a PLL. In some embodiments, the clock rates of the ADC and DAC are fixed and digital sample rate conversion process is employed. Fixing the clock rates of the ADC and the DAC may help reduce phase noise out of the converters. In addition, digital sample rate conversion may further maintain signal integrity. However, it should be understood that reducing phase noise and further maintaining signal integrity is not a requirement of aspects of the present invention. In some embodiments, sample rate converter may be implemented as part of the digital filters in a communication system.

BRIEF DESCRIPTION OF THE DRAWINGS

FIG. 11A is a schematic block diagram representation of a device according to another embodiment of a first aspect of the present invention, which for example, may be used to receive/transmit from/to a communication link that supports a plurality of signal protocols;

FIG. 11B, is a schematic block diagram representation of one embodiment of the DAC of FIG. 11A;

DETAILED DESCRIPTION

Figure 10:
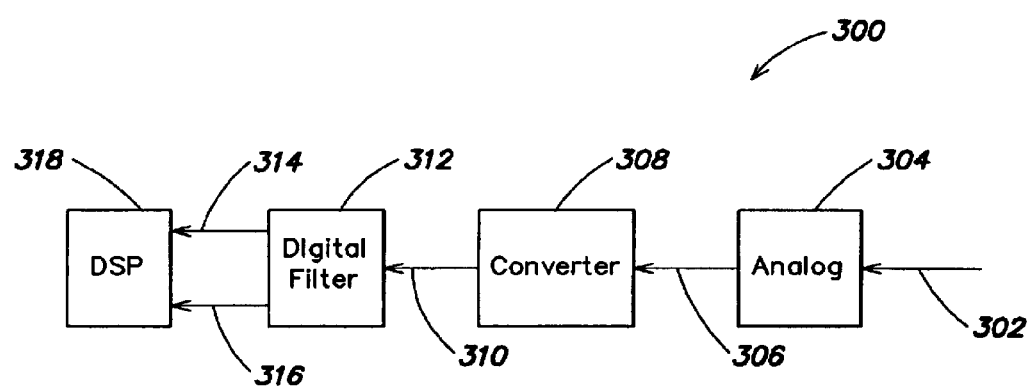
FIG. 10 is a schematic block diagram representation of a device according to one embodiment of a first aspect of the present invention, which for example, may be used to receive from a communication link that supports a plurality of signal protocols.

FIG. 10 illustrates a device 300 according to one embodiment of a first aspect of the present invention, which for example, may be used in a communication system that simultaneously supports a plurality of signal protocols. The communication system may for example include a communication link 302 that carries a signal having a signal having a first component associated with a first signal protocol and a second component associated with a second signal protocol. As stated above, there are many different types of communication links, for example, wired (e.g., conductors, fiber optic cables) or wireless (e.g., microwave links, satellite links,), and combinations thereof, each of which may be public or private, dedicated, and/or shared, e.g., a network. Generally, there are many different types of information that may be transmitted and many different type of signal protocols, although there is no requirement that any given communication system be able to support all types of information and signal protocols.

As used herein the term "supports" as used in the phrase "supports a signal protocol", includes, but is not limited to, to perform any function that assists in gaining access to information being communicated using the signal protocol. The function need not be a function that itself results in access to the information being communicated. The function may be a published function or a private function, and may be industry recognized or not industry recognized. Examples may include but are not limited to processing a received signal so as to complete the communication of the information, processing a received signal so as to reproduce the information being communicated, processing a received signal so as to facilitate a response to the information represented, and/or combinations thereof. A response to information may be, but need not be a reply to the information.

Furthermore, as used herein, a protocol may be any definition of a signal to be transmitted through any communication link. The term protocols includes but is not limited any protocol, standard, or interface definition. A protocol may define one or more characteristics of the signal, and may be published or unpublished, shared or private. The generation of the signal may occur at any time and any point in a system that uses a communication link.

In the illustrated embodiment, the device 300 comprises an analog section 304, which is coupled to the communication link 302 and receives a signal indicative of the first component associated with the first signal protocol and the second component associated with the second protocol. The analog section 304, which may include any type of circuitry for example, but not limited to, circuitry for isolation and/or circuitry for impedance matching (not shown), outputs an analog signal that is supplied, e.g. via signal line 306, to the converter section 308. The converter section 308 may be of any type, and may include one or more analog to digital converters (ADC). Some embodiments may use over sampling and/or one or more sigma delta type ADC's. The converter section 308 generates a sampled data stream, which is supplied, e.g. via signal line 310, to a digital filter 312. The digital filter section 312 outputs two separate sampled data streams, one representative of the first component associated with the first signal protocol and one representative of the second component of the second signal protocol. This may separate the sampled data streams are supplied via signal lines 314, 316 to a digital signal processor (DSP) 318 which may process the data.

As used herein, a DSP may be any type of digital signal processor. For example, the DSP may be programmable or non programmable, may be general purpose or special purpose, dedicated or non dedicated, distributed or non distributed, shared or not shared, and/or any combination thereof. A DSP may comprise hardware, software, firmware, hardwired circuits and/or any combination thereof. The DSP may or may not be part of a host computer.

The term "filter" includes, but is not limited to, changing one or more characteristics of data or signal(s), and/or separating data or signal(s) based on at least one criteria. A change can be any change, including but not limited to a change to magnitude, frequency, phase, sample rate, and content, and/or combinations thereof. The criteria can be any criteria including magnitude, frequency, phase, sample rate, and content, and/or combinations thereof. Thus, for example, a filter need not discriminate on the basis of frequency. The criteria may be predetermined or may be determined dynamically.

The term "to separate" as in "to separate signals" includes but is not limited to partition, to disassociate, to split up, to select, and/or to extract, and/or combinations thereof. For example, the term "to separate" includes, but is not limited to, to attenuate one of the signals, e.g. by using a filter, sufficient to make other(s) of the signals usable, i.e., to permit support of the signal protocol. It should be understood that complete separation of the data or signals streams is not a requirement.

The digital filter section may include any type of digital filter(s), for example including but not limited to decimation interpolation, low pass, high pass, band pass, band stop, all pass (e.g., for phase modification), and/or any combination(s) thereof. The digital filter section 312 may comprise any architecture including but not limited to, for example, finite impulse response (FIR), infinite impulse response (IIR), and/or combinations thereof. The digital filter section may be distributed or non distributed, dedicated or non dedicated, shared or not shared. Characteristics of a digital filter section may be predetermined or may be determined dynamically. The digital filter section 312 may comprise, but is not limited to software, hardware, firmware, or any combination thereof. Further, the digital filter section 312 may be implemented in any form including, but not limited to rules, processes, functions, formulas, equations, look up tables, mappings, etc., or any combination thereof. In some embodiments, the characteristics of the digital filter section are made programmable may be made upgradable. However, programmability and upgradability of characteristics is not required.

The converter section 308 may comprise any architecture for example but not limited to Nyquist, oversampling, sigma-delta, and/or combinations thereof. As with the digital filter section 312, the converter section 308 may have any form including but not limited to software, hardware, firmware, or any combination thereof. Further, the converter section 308 may be implemented in any form including, but not limited to rules, processes, functions, formulas, equations, etc., or any combination thereof.

FIG. 11A illustrates a device 320 according to another embodiment of the first aspect of the present invention, which for example, may be used to receive/transmit from/to a communication link 322 that supports a plurality of signal protocols. The communication link is shown as a phone line having a tip/ring signal. However, the communication link 322 is not limited to such, and may instead be any kind of communication link or combination of communication links that supports a plurality of signal protocols. Furthermore, the illustrated embodiment of the device supports POTS and ADSL, but the device is not limited to such, i.e., other embodiments of the device may support any two or more of the plurality of signal protocols supported by the communication link and/or combination of communication links.

The device comprises an analog section 324, which is coupled to the communication link 322. The analog section is further coupled to a converter section 326, which is coupled to a digital filter section 328, and a DSP 329. Although shown with single ended coupling, the coupling may be single ended, differential, or any combination thereof.

The analog section 324 includes an isolation barrier 330 (e.g., an isolation transformer) that receives a signal having a POTS component and an ADSL component. The isolation barrier 330 provides ground isolation between the device 320 and the communication link 322. The isolation barrier 330 is shown as a transformer but may comprise any type of isolation barrier. The isolation barrier 330 is coupled to a POTS/ADSL combined analog front-end (AFE) 332.

After the combined AFE 332, the signal path splits into a receive side and a transmit side. As to the receive side, the combined AFE 332 outputs an analog signal indicative of the POTS component and the ADSL component, which is supplied to an ADC 334. The ADC 334 generates a sampled data stream indicative of the POTS and the ADSL components. Any type of ADC may be used, for example but not limited to a sigma delta ADC. The sampled data stream is supplied to a POTS digital filter 336 which outputs sampled data stream representative of the POTS component. The sampled data stream from the ADC is further supplied to an ADSL digital filter 338 which outputs a sampled data stream filter representative of the ADSL component. The digital filters 336, 338 are shown as decimation filters, however any suitable type of digital filter may be used. If a digital filter is a decimation type, then the data stream out of the digital filter has a lower sample rate than that of the data stream into the digital filter. In one embodiment of the device, the filter characteristics can be made programmable and may be made upgradable. However, programmability and upgradability of filter characteristics is not required.

The sampled data streams from the digital filters 336, 338 are supplied to the DSP 329, via signal lines 340, 342. The DSP may process the data in accordance with voice (e.g. speaker phone) and/or modem (e.g. V0.90, v0.34, fax etc) and/or ADSL applications. Another interface, e.g. a PCI interface 344 may be used to pass data between the DSP and a computer in the telephone central office (not shown).

As to the transmit side of the signal path, the DSP 329 provides a POTS sampled data stream to a POTS digital filter 346 and provides an ADSL sampled data stream to an ADSL digital filter 348. The POTS sampled data stream is indicative of a POTS signal to be transmitted by the communication system. The ADSL sampled data stream is indicative of a ADSL signal to be transmitted by the communication system. The digital filters 346, 348 each output a sampled data stream, which are combined 350 into a single data stream representative of the POTS component and the ADSL component to be transmitted. The digital filters 346, 348 are shown as interpolation filters, however any suitable types of digital filters may be used. If a digital filter is an interpolation type, then the data stream out of the digital filter has a higher sample rate than that of the data stream into the digital filter. The single combined data stream is supplied to a DAC 352. Any type of DAC may be used. FIG. 11B illustrates one embodiment of a DAC 352, which comprises a DAC sigma delta modulator 356 that feeds a DAC 358. The DAC 352 converts the sampled data stream to an analog signal that is supplied to the transmit side of the combined AFE, through which the analog signal is coupled to the isolation barrier and communication link.

Although the converter section of the illustrated embodiment is shown having a single ADC and a single DAC to receive/transmit POTS and ADSL data any type of converter section may be used. The ADC and DAC may, for example, each be clocked at the same fixed rate e.g. 8.192 MHz.

Sample rate conversion techniques may be used to convert the fixed sample stream to the different sample rates required for POTS and ADSL. Some sample rate conversion techniques are disclosed in U.S. Pat. No. 6,040,793, Switched-Capacitor Sigma-Delta Analog-to-Digital Converter with Input Voltage Overload Protection; U.S. Pat. No. 5,892,468, Digital-to-Digital Conversion Using Nonuniform Sample Rates; U.S. Pat. No. 5,712,635, Digital to Analog Conversion Using Nonuniform Sample Rates; U.S. Pat. No. 5,625,359, Variable Sample Rate ADC; U.S. Pat. No. 5,625,358, Digital Phase-Locked Loop Utilizing a High Order Sigma-Delta Modulator; U.S. Pat. No. 5,963,160, Analog to Digital Conversion Using Nonuniform Sample Rates; U.S. Pat. No. 5,600,320, Variable Sample Rate DAC; U.S. Pat. No. 5,574,454, Digital Phase-Locked Loop Utilizing a High Order Sigma-Delta Modulator; U.S. Pat. No. 5,552,785, Digital Phase-Locked Loop Utilizing a High Order Sigma-Delta Modulator; U.S. Pat. No. 5,528,240, Digital Phase-Locked Loop Utilizing a High Order Sigma-Delta Modulator; U.S. Pat. No. 5,512,897, Variable Sample Rate DAC; U.S. Pat. No. 5,497,152, Digital-to-Digital Conversion Using Non-uniform Sample Rates; U.S. Pat. No. 5,489,903, Digital to Analog Conversion Using Non-uniform Sample Rates; U.S. Pat. No. 5,485,152, Analog to Digital Conversion Using Non-uniform Sample Rates; U.S. Pat. No. 5,353,026, Fir Filter with Quantized Coefficients and Coefficient Quantization Method; U.S. Pat. No. 5,313,205, Method for Varying the Interpolation Ratio of a Digital Oversampling Digital-to-Analog Converter System and Apparatus Therefor; which are incorporated by reference herein. However, any sample rate conversion techniques may be used. In the illustrated embodiment the rate conversion is combined with the interpolation/decimation functions. These functions could be separated. Further, oversampling is not a requirement.

It will be recognized that in the illustrated embodiment, the analog section comprises a single signal path that carries the POTS and ADSL (and/or other signal protocols) components of the received/transmitted signal simultaneously. It should be understood however, that the device is not limited to such an embodiment.

In one embodiment, the device is realized using an AD1824 and an AD1827 available from Analog Devices, Inc. The AD1824 (not shown) includes one embodiment of the combined AFE 332, the ADC 334, and the DAC 358. The AD1827 (not shown) includes one embodiment of the PCI interface 344, the DSP 329, the digital filter section 328, and the DAC modulator 356.

Figure 12A:
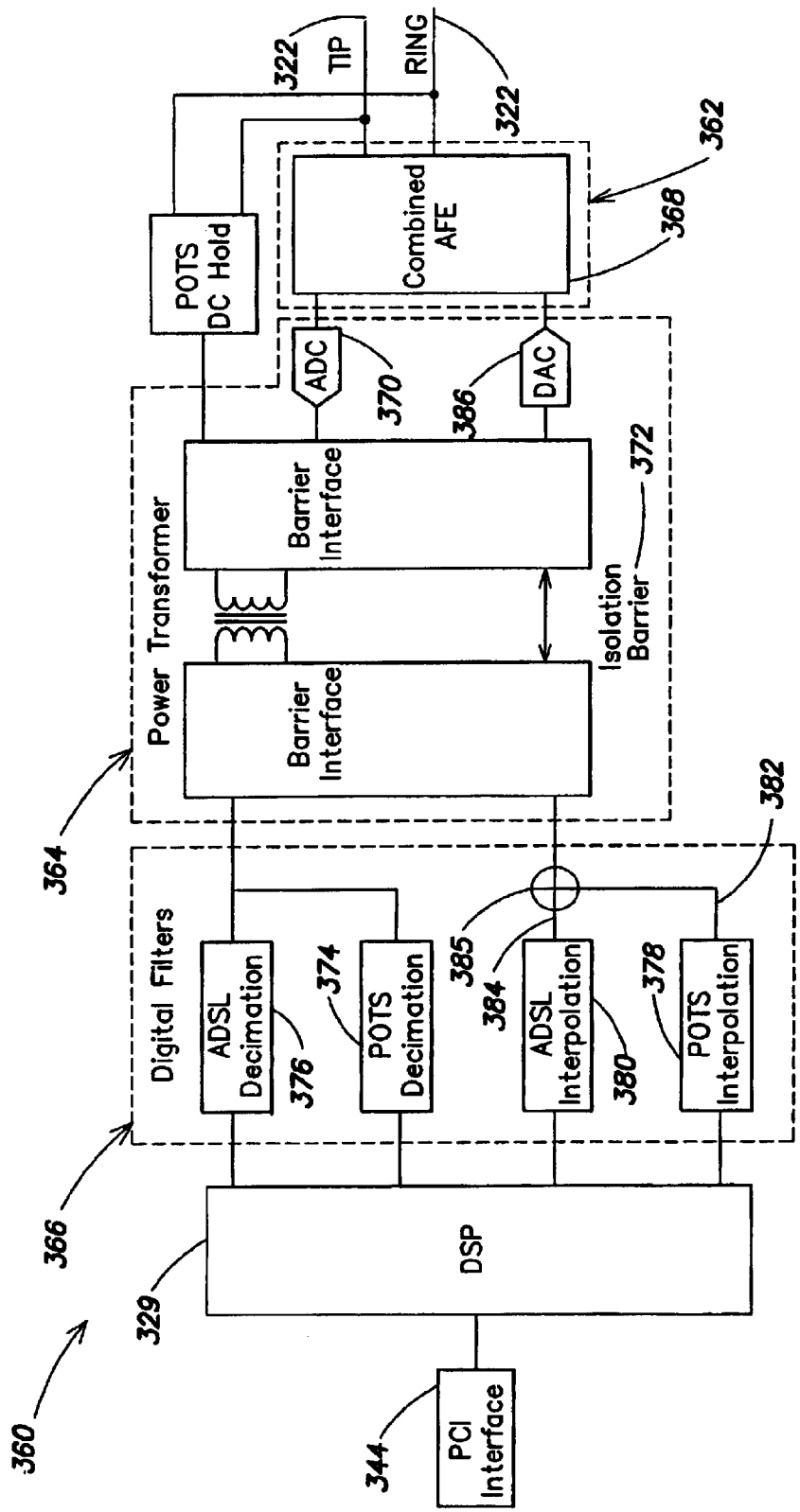
FIG. 12A is a schematic block diagram representation of a device according to another embodiment of a first aspect of the present invention, which for example, may be used to receive/transmit from/to the communication link of FIG. 11A.

FIG. 12A illustrates a device 360 according to another embodiment of the first aspect of the present invention, which for example, may be used to receive/transmit from/to the communication link 322. One difference between the device 320 illustrated in FIG. 11A and the device 360 illustrated in FIG. 12A is that the device 320 of FIG. 11A provides isolation, e.g. the isolation barrier 330, on the analog side of the signal path, whereas the device 360 of FIG. 12A employs isolation on the digital side of the signal path, as further discussed below.

As discussed with respect to FIG. 10, the communication link 322 of FIG. 12A is shown as a phone line that carries a tip/ring signal, and may support POTS and ADSL (and/or other phone line signal protocols). However, the communication link is not limited to such. Furthermore, the illustrated embodiment of the device 360 supports POTS and ADSL, but the device is not limited to such.

Referring now to FIG. 12A, the device 360 comprises an analog section 362, which is coupled to the communication link 322, a converter section 364, and a digital filter section 366. The device 360 illustrated in FIG. 12A comprises a single signal path that carries the POTS and ADSL simultaneously but the device is not limited to such embodiment.

The analog section 362 includes a combined AFE 368 that receives a signal having a POTS component and an ADSL component. After the combined AFE 368, the signal path splits into a receive side and a transmit side. As to the receive side, the combined AFE 368 outputs an analog signal indicative of the POTS component and the ADSL component, which is supplied to an ADC 370. The ADC 370 generates a sampled data stream indicative of the POTS and the ADSL components.

The sampled data stream from the ADC 370 is supplied to an isolation barrier 372. The isolation barrier 372 outputs an isolated sampled data stream to a POTS digital filter 374 and an ADSL digital filter 376. The digital filters 374, 376 output separate sampled data streams. The POTS digital filter 374 outputs a sampled data stream representative of the POTS component. The ADSL digital filter 376 outputs a sampled data stream representative of the ADSL component. The sampled data streams may be input to the DSP 329 which may process the data. The characteristics of the digital filter can be made programmable and may be made upgradable, but programmability and upgradability of characteristics is not required.

As to the transmit side of the signal path, the DSP 329 provides a POTS sampled data stream to a POTS digital filter 378 and provides a an ADSL data stream to an ADSL digital filter 380. The POTS digital filter 378 outputs a sampled data stream on a line 382. The ADSL digital filter 380 outputs a sampled data stream on a line 384, which is separate from the sampled data stream on line 382. The sampled data streams from the digital filters 378, 380 are combined 385 into a single data stream representative of the POTS component and the ADSL component to be transmitted. The digital filters 378, 380 are shown as interpolation filters, however any suitable type of digital filter may be used. The single combined data stream is supplied to the isolation barrier 372. The isolation barrier 372 outputs an isolated sampled data stream to a DAC 386. The DAC 386 converts the sampled data stream to an analog signal that is supplied to the combined AFE 368, whereby the analog signal is coupled to communication link 322.

Although the converter section of the illustrated embodiment is shown having a single ADC and a single DAC to receive/transmit POTS and ADSL data any type of converter section may be used. The ADC and DAC may, for example, each be clocked at the same fixed rate e.g. 8.192 MHz.

Sample rate conversion techniques may be used to convert the fixed sample stream to the different sample rates required for POTS and ADSL. In the illustrated embodiment the rate conversion is combined with the interpolation/decimation functions. These functions could be separated. Further, oversampling is not a requirement.

Figure 12B:
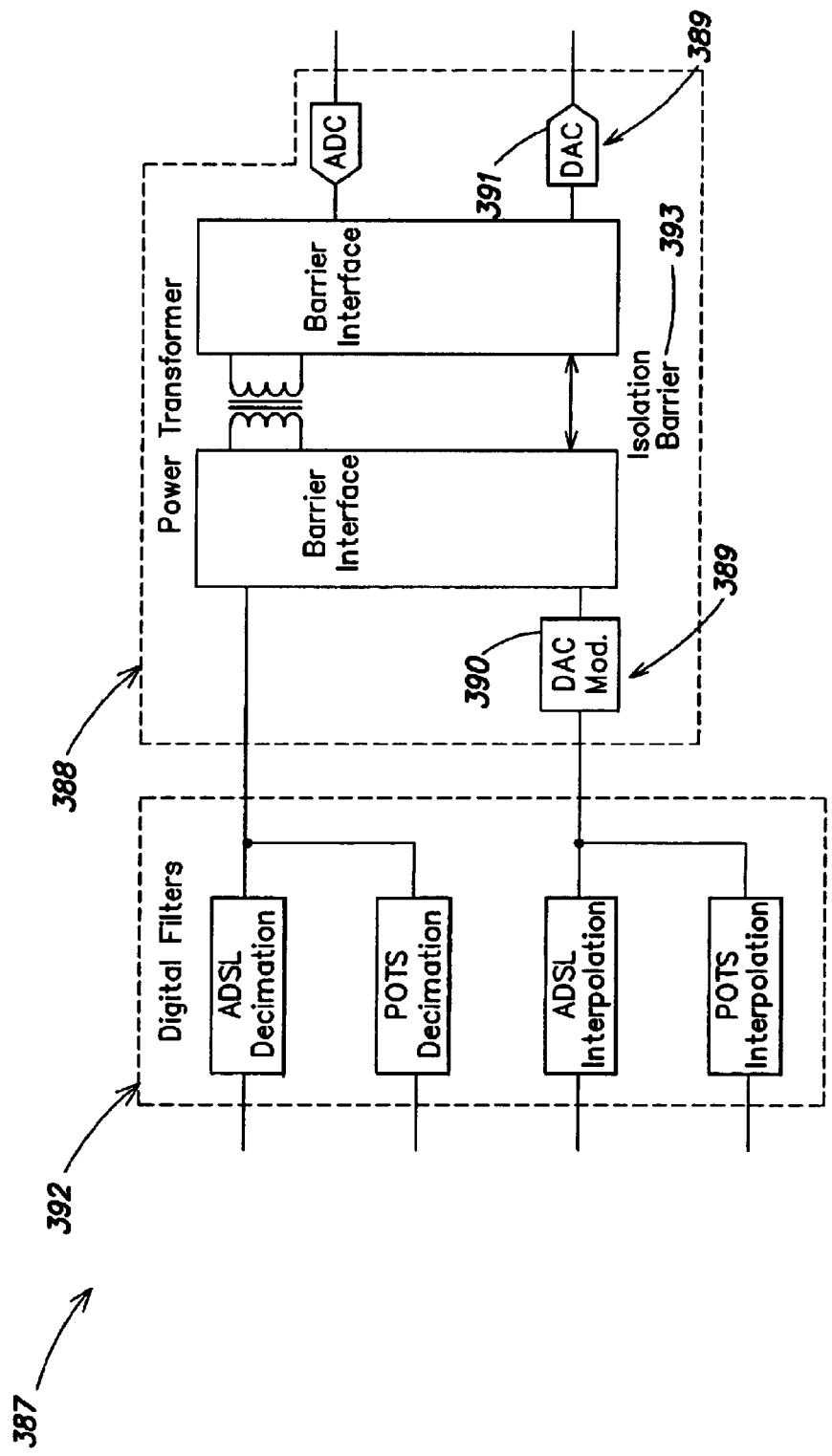
FIG. 12B is a schematic block diagram representation of a portion of a device according to another embodiment of a first aspect of the present invention.

In some embodiments, the DAC may be a sigma delta converter. FIG. 12B illustrates one embodiment of a converter section having sigma delta converter type of DAC. Referring now to FIG. 12B, a digital converter section 388 has a DAC 389 comprising a DAC modulator 390 and a DAC 391. The DAC modulator 390 is coupled between a digital filter section 392 and one side of a barrier interface 393. The DAC 391 is coupled to the other side of the isolation barrier 392.

In one embodiment in which the converters are sigma delta converters, each are clocked at the same fixed rate e.g. 8.192 MHz, the ADC resolution is 12 bits, the DAC resolution is 4 bits, the output of the ADSL and POTS decimation filters are 16 bits each, and the inputs to the ADSL and POTS interpolation filters are 16 bits each.

It will be recognized that in the illustrated embodiment, the analog section comprises a single signal path that carries the POTS and ADSL (and/or other signal protocols) components of the received/transmitted signal simultaneously. However, it should be understood that the device is not limited to such embodiment.

In one embodiment, the device is realized using an AD1824 and an AD1827 available from Analog Devices, Inc. The AD1824 (not shown) includes one embodiment of the combined AFE 368, the ADC 370, and the DAC 386. The AD1827 (not shown) includes one embodiment of the PCI interface 344, the DSP 329, the digital filter section 366, and the DAC modulator 356.

Figure 13:
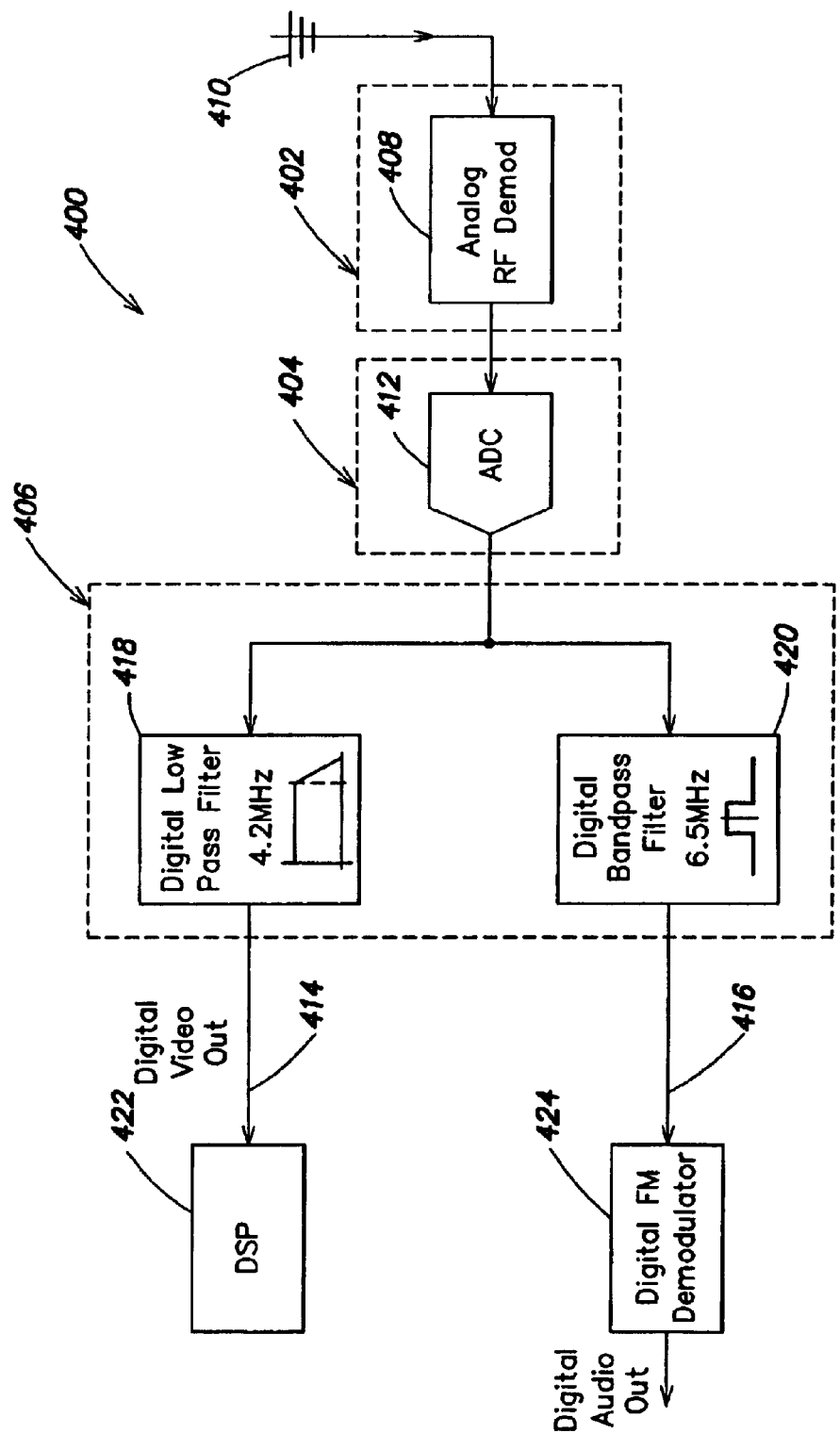
FIG. 13 is a schematic block diagram representation of a device according to a another embodiment of a first aspect of the present invention, which for example may be used to receive broadcast television signals.

FIG. 13 illustrates a device 400 according to a third embodiment, which may for example be used in a receiver portion of a communication system that supports broadcast television signals. The receiver includes an analog section 402, a converter section 404 and a digital filter section 406. The analog section 402 includes an RF demodulator 408 that is coupled to an antenna 410 and receives an RF modulated signal having a video component and an audio component. The audio component is an FM modulated audio signal. The RF demodulator 408 outputs a demodulated signal which is a sum of the video component and the FM modulated audio component. The signal from the RF demodulator 408 is supplied to an ADC 412 that generates a sampled data stream indicative of the video component and the FM modulated audio component. The sample data stream is supplied to the digital filter section 406 which outputs two separate sampled data streams, one on signal line 414 and one on signal line 416. The data stream output on signal line 414 is representative of the video component. The data stream on signal line 416 is representative of the audio component.

In the illustrated embodiment, the digital filter section 406 includes a video path digital filter 418 and an audio path digital filter 420. The video path digital filter 418 is shown as a digital low pass filter, but may be any type of video path digital filter. The audio path digital filter 420 is shown as a digital band pass filter may be any type of audio path digital filter.

The data stream from the video path digital filter 418 may be supplied to a DSP 422. The data stream from the audio path digital filter 420 may be supplied to a digital FM demodulator 424 which now puts a sample data stream that is indicative of the audio component.

Figure 14A:
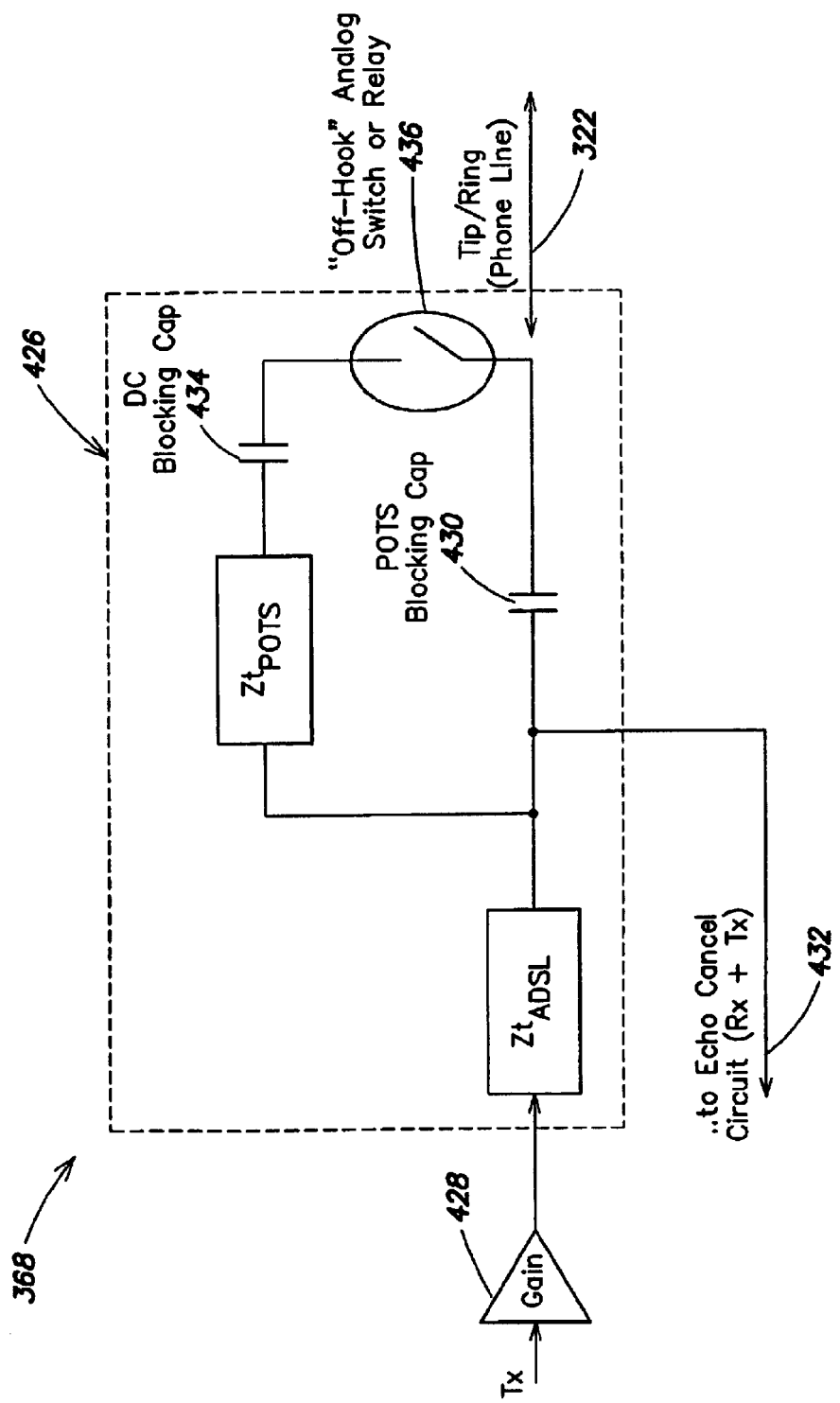
FIG. 14A is a schematic block diagram representation of a termination impedance circuit according to one embodiment of a second aspect of the present invention, which for example, may be used in the communication system of FIG. 11A.

FIG. 14A illustrates one embodiment of the AFE 368 of the device 360 (FIG. 12A) that includes a termination impedance circuit 426 according to one embodiment of a second aspect of the present invention The termination impedance circuit 426 may for example be used to provides a selectable impedance in a communication system that supports a plurality of signal protocols. The AFE termination impedance circuit 426 is coupled to a communication link 322. As discussed above with respect to FIG. 12A, the communication link 322 is shown as a phone line that carries a tip/ring signal, but is not limited to such.

Furthermore, the illustrated embodiment of the termination impedance circuit 426 of FIG. 14A is specifically adapted to support POTS and ADSL in the same signal path, for example in the combined AFE of the device of FIG. 11A, but the termination impedance of the second aspect of the present invention is not limited to such, i.e., other embodiments of the termination impedance may support any two or more of the plurality of signal protocols supported by the communication link and/or combination of communication links.

In the illustrated embodiment, the termination impedance circuit 426 includes a first impedance, e.g. $Zt_{ADSL}$, which may be coupled to a gain stage 428 in the transmit side of the AFE 368. The first impedance, e.g. $Zt_{ADSL}$, is connected in series with a blocking component 430, e.g. a capacitor, which is coupled to the communication link 322. A connection of the first impedance, e.g., $Zt_{ADSL}$, and the blocking component 430 may be coupled 432 to an echo cancel circuit of the AFE 368. A second impedance, e.g. $Zt_{POTS}$, is connected in series with a DC blocking component 434, e.g., a capacitor, and a switch network, 436 represented here by a switch. The series combination of the second impedance, e.g. $Zt_{POTS}$, the DC blocking component 434 and the switch network 436 are connected in parallel with the blocking component 430, e.g., a capacitor. The switch network may be used to select different combinations of the impedance elements depending on the protocol being supported. As shown, the switch network is controlled in response to an "off-hook" signal.

The operation of the termination impedance circuit 426 in one embodiment is as follows. The termination impedance circuit 426 has two states, one that is used to support ADSL only, and one that is used to support ADSL and POTS. If the "off-hook" signal indicates an "on-hook" state, then the switch is in the open state, whereby the termination impedance circuit is the ADSL only state.

Figure 15B:
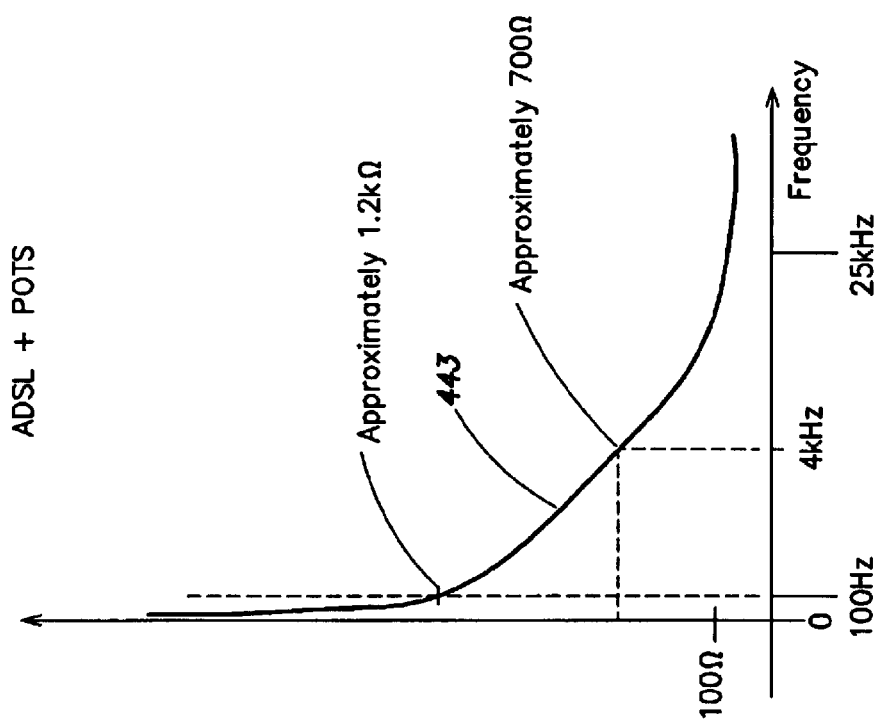
FIG. 15 is a graphical illustration of impedance characteristics provided by one embodiment in one state of the termination impedance circuit of FIG. 14A and FIG. 14B.
Figure 15A:
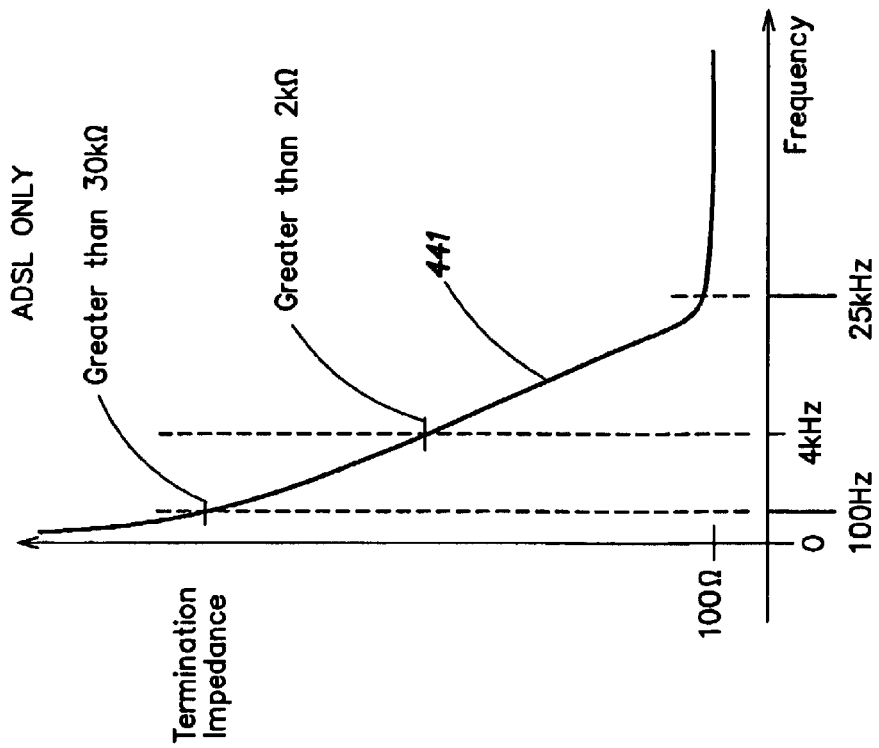

FIG. 15A has a curve 441 that illustrates the magnitude of the termination impedance provided by the termination impedance circuit 426 in the ADSL only state.

In the ADSL only state, the second impedance, e.g. $Zt_{POTS}$, is not connected in parallel with the blocking component 430. Consequently, at frequencies above 25.875 kHz, the termination impedance circuit 426 presents an impedance equal to the first impedance, e.g. $Zt_{ADSL}$, to the line. At frequencies in the POTS range (100 Hz–>4 kHz), the termination impedance circuit 426 presents a relatively large termination impedance to line, preferably greater than two thousand ohms (2 kΩ). The relatively large termination impedance is preferably provided at least in part by the blocking component 430, e.g., the capacitor. This operation helps to ensure that if another phone on the line is off-hook, the AFE 368 does not add significant attenuation to the POTS signal. At frequencies <100 Hz, the termination impedance circuit 426 presents a large impedance to the POTS ring signal, preferably greater than thirty thousand ohms (30 kΩ), which is also provided at least in part by the blocking component 430, e.g., the capacitor.

If on the other hand, the "off-hook" signal indicates an "off-hook" state, then the switch 436 is in the closed state, whereby the termination impedance circuit 426 is the ADSL and POTS state. The graph in FIG. 15B has a curve 443 that illustrates the magnitude of the termination impedance provided by the termination impedance circuit 426 in the ADSL and POTS state. In the ADSL and POTS state, the combination of the second impedance, e.g. $Zt_{POTS}$, and the DC blocking component 434, is connected in parallel with the blocking component 430. At frequencies from 50 Hz to 552 kHz, the termination impedance circuit 426 presents an impedance equal to a sum of the first impedance and the second impedance (e.g., $Zt_{ADSL}+Zt_{POTS}$), which results in an impedance profile that approximately matches that of a typical phone line. At frequencies below 50 Hz the impedance of the DC blocking component 434 preferably becomes large enough to dominate.

As stated above, although described with respect to an embodiment to support POTS and ADSL, in other embodiments, the termination impedance circuit may supports other combinations of two or more protocols.

In one embodiment the termination impedance 426 is used in conjunction with an AFE that is realized using an AD1824, available from Analog Devices, Inc. and discussed above. In such embodiment, the termination impedance is designed such that the ring portion of the receive signal is significantly attenuated, e.g., attenuated by greater than sixty decibels (60 dB). This helps to prevent the ring signal from saturating the receive input to the AD1824.

Some embodiments of the termination impedance circuit may help reduce the number of external analog components since several different split termination networks are replaced by a single network. Furthermore, some embodiments of the termination impedance circuit may help provide more accurate termination characteristics for the phone line which in turn may help reduce reflections and may improve the quality of the communications. However, there is no requirement that the termination impedance circuit help reduce the number of external analog components or help provide more accurate termination characteristics.

Figure 14B:
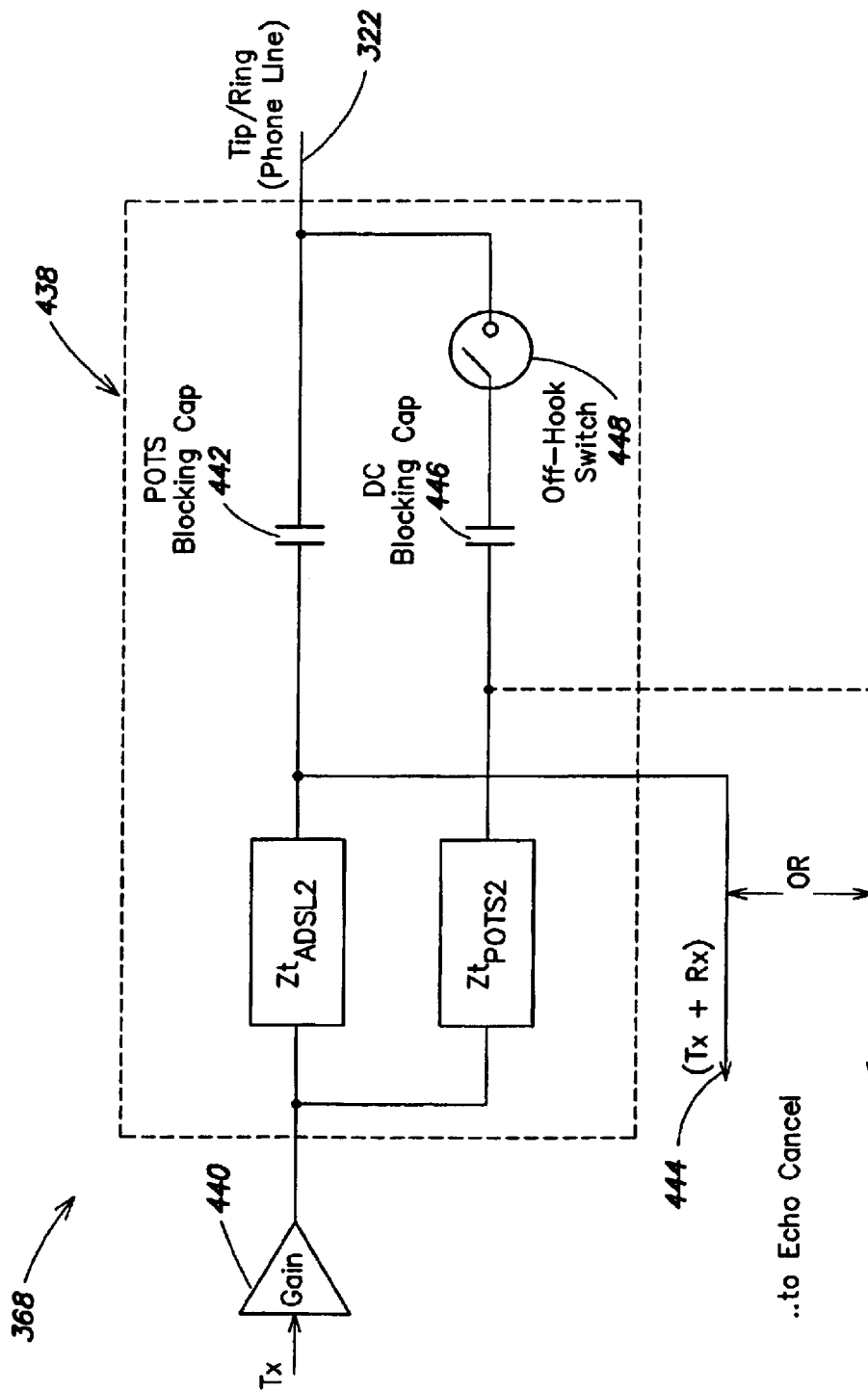
FIG. 14B is a schematic block diagram representation of a termination impedance circuit according to another embodiment of a second aspect of the present invention, which for example, may be used in the communication system of FIG. 11A.

FIG. 14B illustrates another embodiment of the AFE 368 of the device 360 (FIG. 12A) that includes a termination impedance circuit 438 according to another embodiment of a second aspect of the present invention. The termination impedance circuit 438 may for example be used to provide a selectable impedance in a communication system. In the illustrated embodiment, the termination impedance circuit 438 includes a first impedance, e.g. $Zt_{ADSL2}$, which may be coupled to the gain stage 440 in the transmit side of the AFE 368. The first impedance, e.g. $Zt_{ADSL2}$, is connected in series with a blocking component 442, e.g. a capacitor, which is coupled to the communication link 322. A connection of the first impedance, e.g. $Zt_{ADSL2}$, and the blocking component 442 may be coupled 444 to an echo cancel circuit of the AFE 368. A second impedance, e.g. $Zt_{POTS2}$, is connected in series with a DC blocking component 446, e.g., a capacitor, and a switch network 448, represented here by a switch. The series combination of the second impedance, e.g. $Zt_{POTS2}$, the DC blocking component 446 and the switch network 448 are connected in parallel with the series combination of the first impedance, e.g. $Zt_{ADSL2}$, and the blocking component 442, e.g. the capacitor. The switch network 448 may be used to select different combinations of the impedance elements depending on the protocol being supported. As shown, the switch network is controlled in response to an "off-hook" signal. This termination impedance circuit 438 has two states, one that is used to support ADSL only, and one that is used to support ADSL and POTS. If the "off-hook" signal indicates an "on-hook" state, then the switch is in the open state, whereby the termination impedance circuit is the ADSL only state. If on the other hand, the "off-hook" signal indicates an "off-hook" state, then the switch 448 is in the closed state, whereby the termination impedance circuit 438 is the ADSL and POTS state.

Although described with respect to various embodiments, the selectable termination impedance circuit is not limited to such. For example, other configurations and components may be used. In addition, various other arrangements of the illustrated components may be used including but not limited to embodiments in which the relative positions of the second termination impedance and the switch network are swapped compared to the relative positions illustrated in FIG. 14A and FIG. 14B.

Further, any criteria may be used to control the selection. The criteria may be predetermined or may be determined dynamically. The criteria may be embodied in software, hardware, firmware, or any combination thereof. Further, the criteria may be implemented in any form including, but not limited to rules, processes, functions, formulas, equations, look up tables, mappings, etc., or any combination thereof.

Further, although the switch network is shown as a switch, any type of switch network may be used. Thus for example, a switch network may comprise a single element. As another example, a switching network may comprise a plurality of elements that function as a switch. Further, a switch may include but is not limited to one or more active elements (for example one or more transistors) and may but need not employ MOS technology.

Figure 16A:
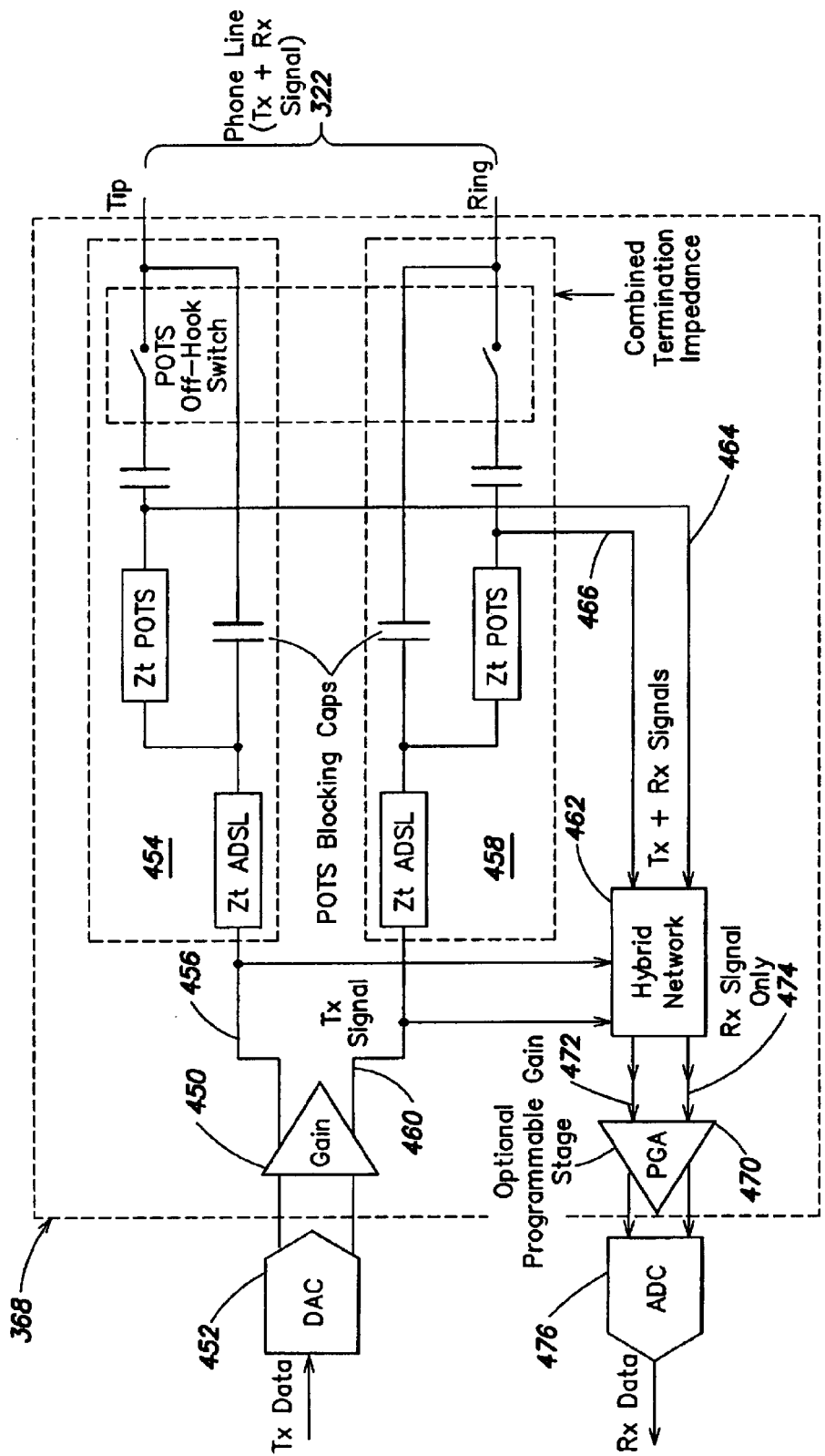
FIG. 16A is a schematic block diagram representation of one embodiment of the combined analog front end used in the communication system of FIG. 11A.

FIG. 16A is a schematic block diagram representation of another embodiment of a combined AFE 368. Referring now to 16A, the combined AFE 368 comprises a gain stage 450 that receives a differential signal from a DAC 452. The gain stage 450 outputs a differential signal, Tx. One side of the Tx signal is supplied to a first selectable termination impedance circuit 454 via signal line 456. The other side of the Tx signal is supplied to a second selectable termination impedance circuit 458 via signal line 460. The first and second selectable termination impedance circuits 454, 458 couple the Tx signal to the communication link 322. The Tx signal is also supplied from the gain stage 450 to a hybrid network 462, which further receives a differential Tx+Rx signal from the selectable termination impedance circuits. One side of the Tx+Rx signal is supplied to the hybrid network 462 from the first termination impedance 454 circuit via signal line 464. The other side of the Tx+Rx signal is supplied to the hybrid network 462 from the second termination impedance circuit 458 via signal line 466. In this example, one hybrid network is used. This hybrid network performs the local analog echo cancel function, i.e. it subtracts the locally generated Tx signal from the phone line signal leaving substantially only the Rx signal at the programmable gain stage input. Performance of the echo cancel depends at least in part on the matching of the termination impedance to the phone line impedance and as a consequence, the removal of the Tx signal may not be complete. The hybrid network has a first input that receives a signal indicative of a Tx signal, and a second input that receives a signal indicative of the Tx+Rx signal on the phone line. The hybrid network 462 outputs a differential signal Rx, which may be supplied to a programmable gain stage 470 via signal lines 472, 474. The programmable gain stage 470 outputs a differential signal to an ADC 476. The electrical connections in this AFE 368 can be either differential, as shown, or single ended.

Figure 16B:
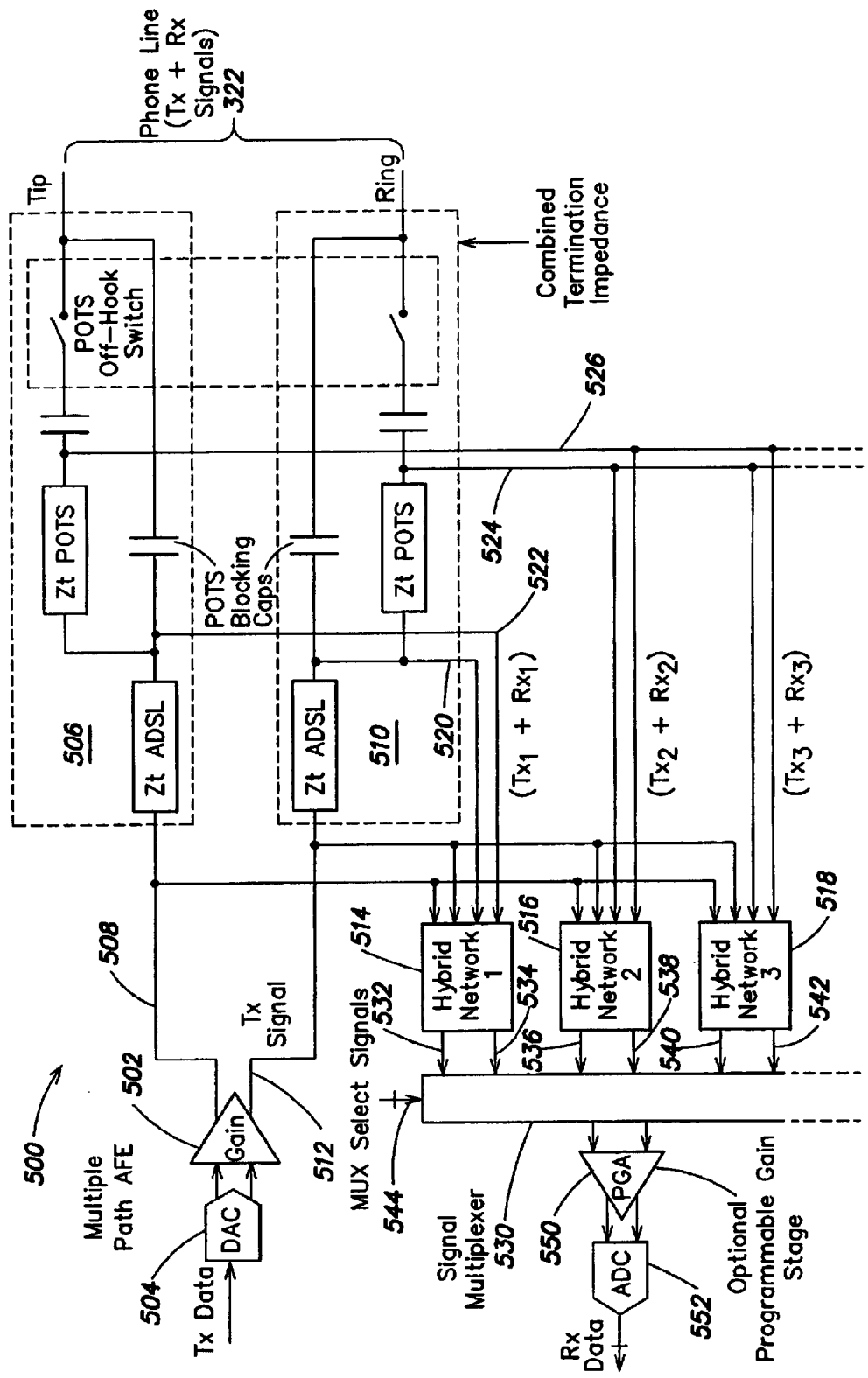
FIG. 16B is a schematic block diagram representation of another embodiment of the combined analog front end used in the communication system of FIG. 11A.

FIG. 16B is a schematic block diagram representation of another embodiment of the combined analog front end which for example may be used in the communication system of FIG. 11A. In this example, multiple selectable hybrid networks are used for local echo cancellation as described below.

Referring now to 16B, the combined AFE 500 comprises a gain stage 502 that receives a differential signal from a DAC 504. The gain stage 502 outputs a differential signal, Tx. One side of the Tx signal is supplied to a first selectable termination impedance circuit 506 via signal line 508. The other side of the Tx signal is supplied to a second selectable termination impedance circuit 510 via signal line 512. The first and second selectable termination impedance circuits 506, 510 couple the Tx signal to the communication link 322. The Tx signal is also supplied from the gain stage 502 to a plurality of hybrid networks, represented by hybrid network 1 (514), hybrid network 2 (516) and hybrid network 3 (518). Each of the plurality of hybrid networks further receives one of a plurality of differential Tx+Rx signals available from the selectable termination impedance circuits. For example, hybrid network 1 receives a first differential Tx+Rx signal via signal lines 520, 522. Hybrid network 2 and hybrid network 3 each receives a second differential Tx+Rx signal via signal lines 524, 526. The hybrid network 1, the hybrid network 2, and the hybrid network 3 each performs a local analog echo cancel function, i.e. it subtracts the received locally generated Tx signal from the received Rx+Tx signal. As stated above performance of the echo cancel depends at least in part on the matching of the termination impedance to the phone line impedance and as a consequence, the removal of the Tx signal may not be complete.

The hybrid network 1 outputs a differential signal Rx, which is supplied to a multiplexor 530, via signal lines 532, 534. The hybrid network 2 outputs a differential signal Rx, which is supplied to the multiplexor 530, via signal lines 536, 538. The hybrid network 3 outputs a differential signal Rx, which is supplied to the multiplexor 530, via signal lines 540, 542. The multiplexor receives mux select signals 544, and in response thereto, selects the Rx signal supplied from one (or more) of the hybrid networks. The multiplexor 530 supplies the selected Rx signal to a programmable gain stage 550 which supplies an ADC 552. The electrical connections in this AFE 500 can be either differential, as shown, or single ended.

In some embodiments, these hybrid networks are optimized for different phone line characteristics and/or communications protocols. As an example, hybrid 1 may be tuned for ADSL only, hybrid 2 for POTS only and hybrid 3 for both. This optimization can prove useful for improving local echo cancellation performance since this is highly dependent on the impedance matching between the phone line and the termination. Compared to FIG. 16A, FIG. 16B illustrates a potentially more optimized solution at a higher cost.

Any criteria may be used to control the selection. The criteria may be predetermined or may be determined dynamically. The criteria may be embodied in software, hardware, firmware, or any combination thereof. Further, the criteria may be implemented in any form including, but not limited to rules, processes, functions, formulas, equations, look up tables, mappings, etc., or any combination thereof.

Figure 17:
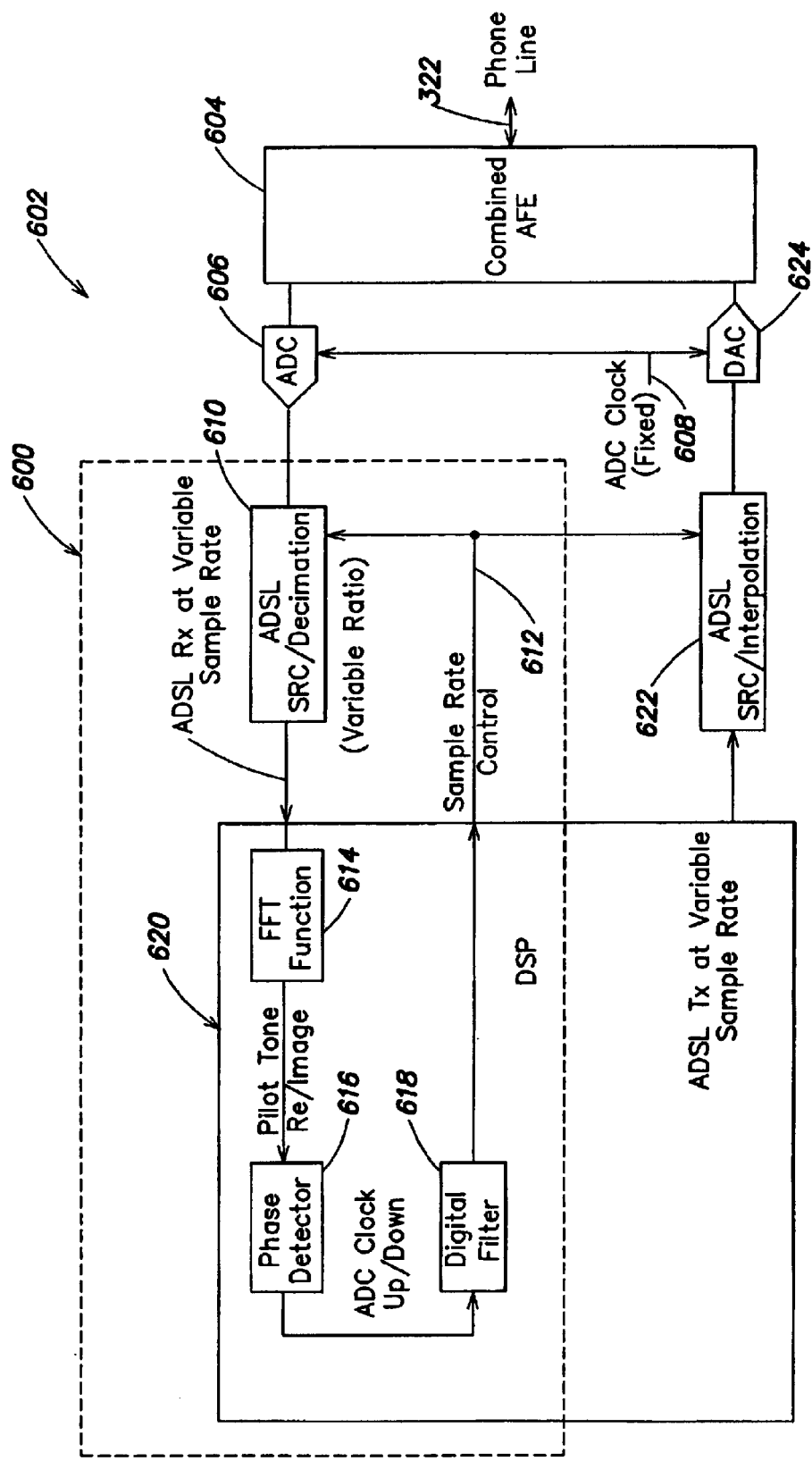
FIG. 17 is a schematic block diagram representation of a device according to one embodiment of a third aspect of the present invention, which for example, may be used in a phase locked loop of the communication system of FIG. 12A.

Further, any type of multiplexor may be used. Thus for example, a multiplexor may comprise a single element. As another example, a multiplexor may comprise a plurality of elements that function as a multiplexor. Further, a multiplexor may include but is not limited to one or more active elements (for example one or more transistors) and may but need not employ MOS technology. FIG. 17 illustrates one embodiment of a third aspect of the present invention, as used for example, in a sample rate conversion based PLL 600 for a device 602 that receives/transmits from/to the communication link 322. As discussed above, the communication link 322 is shown as a phone line but is not limited to such. Furthermore, although the illustrated embodiment of FIG. 17 is specifically adapted to support ADSL, the invention is not limited to such.

An isolation barrier is not shown in FIG. 17, but, if an isolation barrier is desired, then the isolation barrier may be positioned as shown in FIG. 11A or FIG. 12A, or in any other suitable position.

In this embodiment, the device 602 has an AFE 604 that is coupled to the communication link 322. The AFE outputs an analog signal, which is supplied to an ADC 606 on the receive side of a signal path. The ADC 606 is supplied with a fixed rate clock 608, e.g., 8.192 megahertz (MHz), which may be derived from a system clock (not shown). The ADC 606 responds by producing a sampled data stream that has a fixed sample rate. The sampled data stream may, for example, be indicative of a POTS component and an ADSL component. Note that in ADSL applications, a single pilot tone frequency is included in the transmitted signal as a reference.

The fixed rate sampled data stream from the ADC is supplied to a decimation filter 610, e.g., an ADSL decimation filter, in the sample rate conversion based PLL 600. The decimation filter 610 applies variable ratio decimation to generate a sampled data stream having a variable sample rate, and being divided down compared to that from the ADC. The sample rate out of the decimation filter 610 is controlled by a digital control loop that outputs a sample rate control signal on signal line 612 so as maintain phase and/or frequency lock between the device 602 and a transmitter (not shown), as discussed below.

The digital control loop includes an FFT function 614 that extracts real and imaginary components of the pilot tone. The extracted components are input to a phase detector 616, which produces a signal, e.g., an up/down, that is passed through a digital filter 618 to generate the sample rate control signal on signal line 612. The sample rate control signal is supplied to the digital filter, e.g., the decimation filter, to control the sample rate out of the digital filter, which thereby maintains the phase and/or frequency lock.

In one embodiment, control authority/resolution of the digital control loop is such that the decimation filter 610 decimates the data stream from a fixed sample rate of 8.192 MHz down to a sample rate of 1.104 MHz+/−400 ppm in increments of 0.048 ppm. The FFT function 614, the phase detector 616, and the digital filter 618, may be, but need not be, embodied in a DSP 620, and may be, but need not be, the same as those used in the convention PLL shown in FIG. 9.

Figure 1:
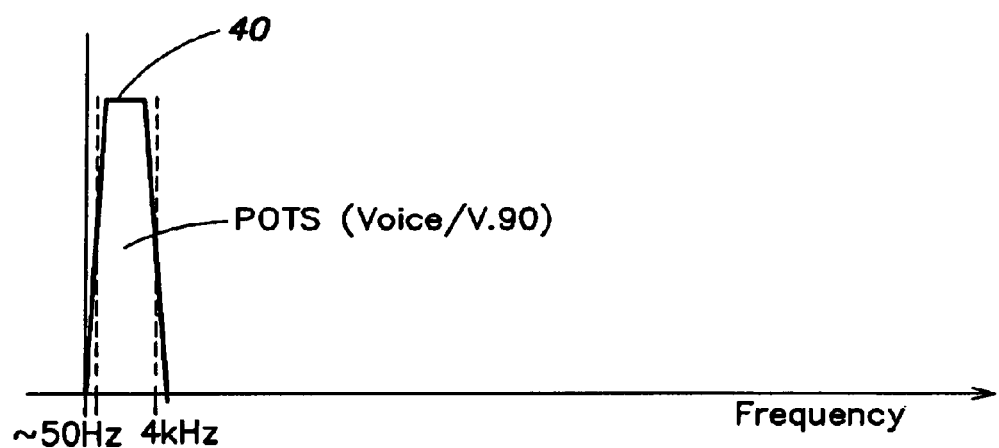
FIG. 1 is a graphical representation of a signal frequency spectrum of a POTS.
Figure 2:
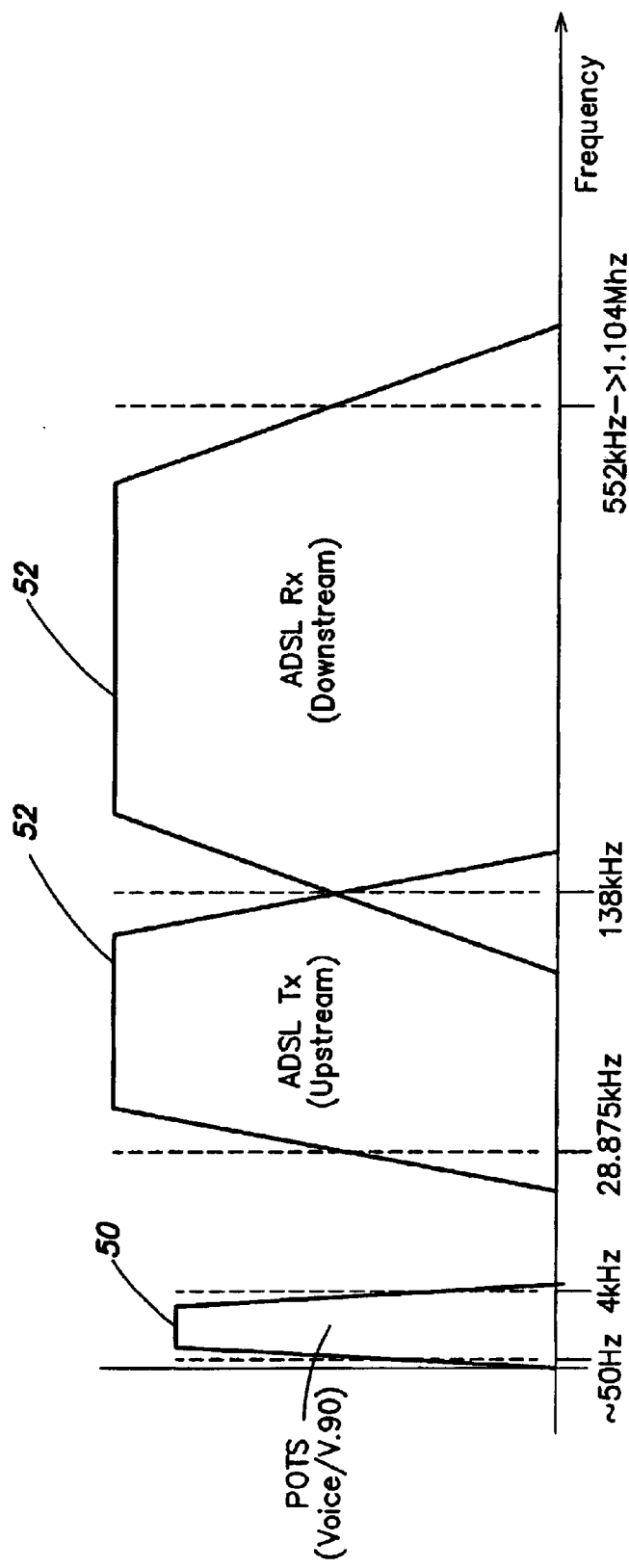
FIG. 2 is a graphical representation of a signal frequency spectrum of a POTS signal protocol and a signal frequency spectrum of an ADSL signal protocol.
Figure 3:
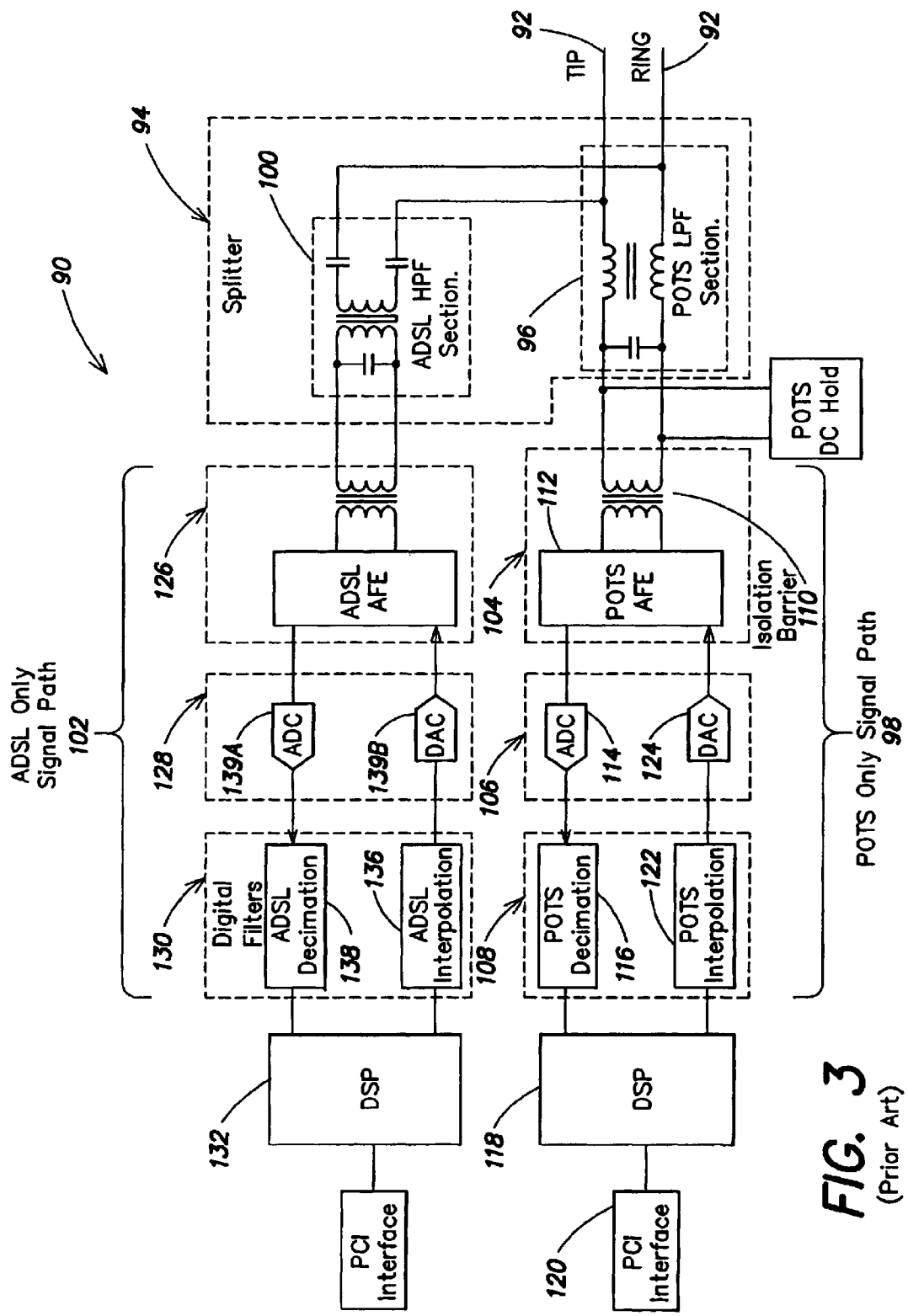
FIG. 3 is a schematic block diagram of a prior art receiver/transmitter portion of a communication system that supports the POTS signal protocol and the ADSL signal protocol represented in FIG. 1.
Figure 4:
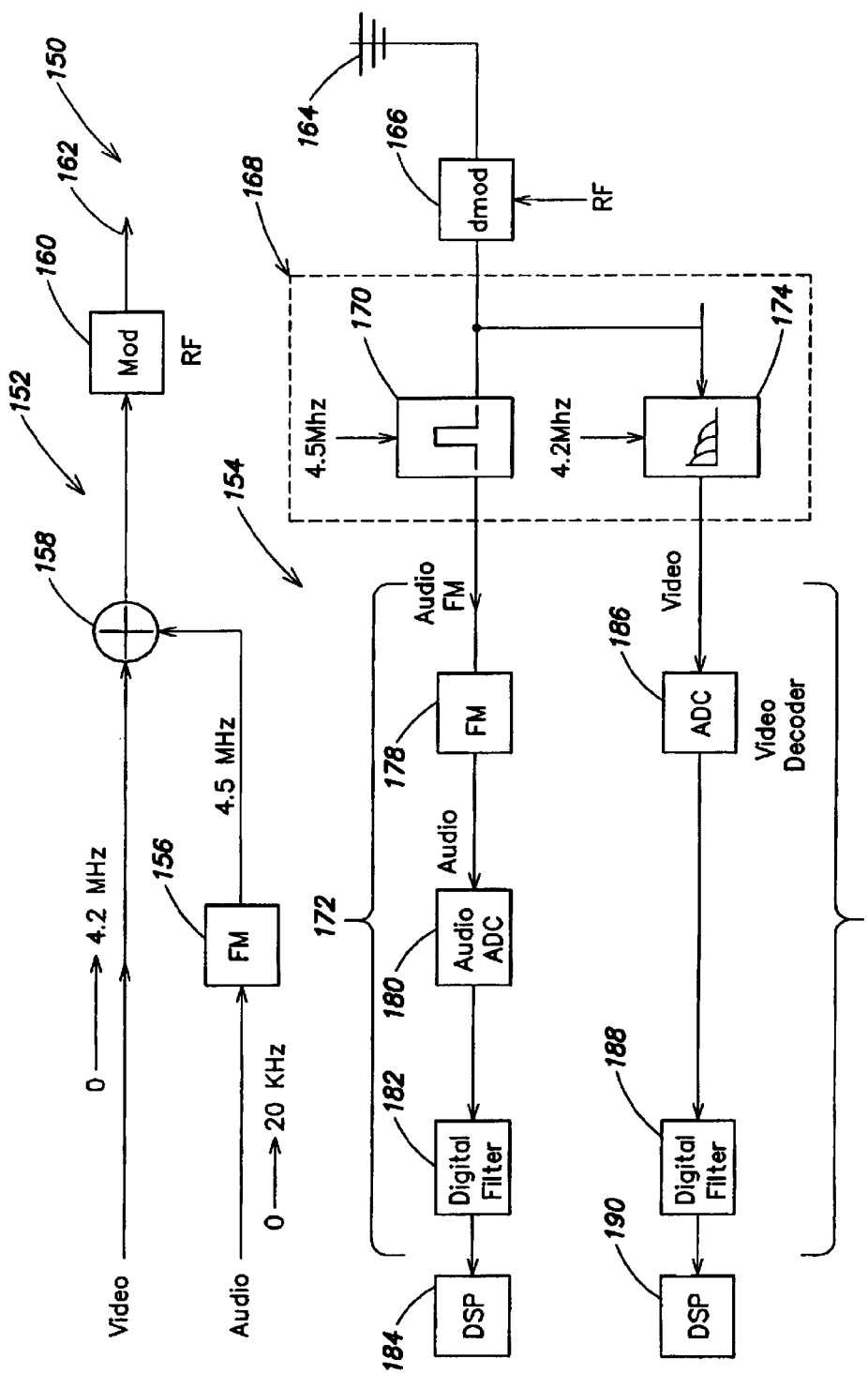
FIG. 4 is a schematic block diagram of a prior art receiver/transmitter portion of a communication system that supports television broadcast including video and audio.
Figure 5:
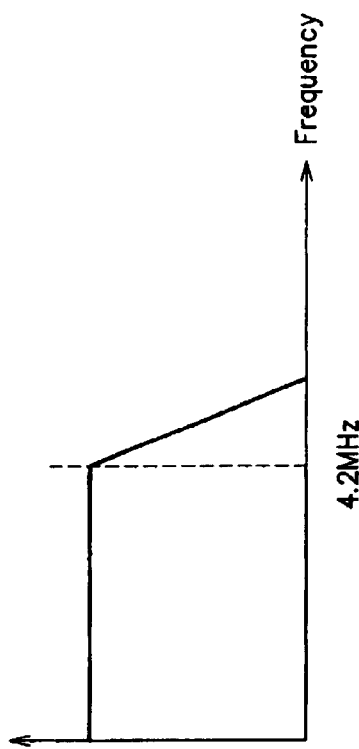
FIG. 5 is a graphical representation of a signal frequency spectrum of a video signal.
Figure 6:
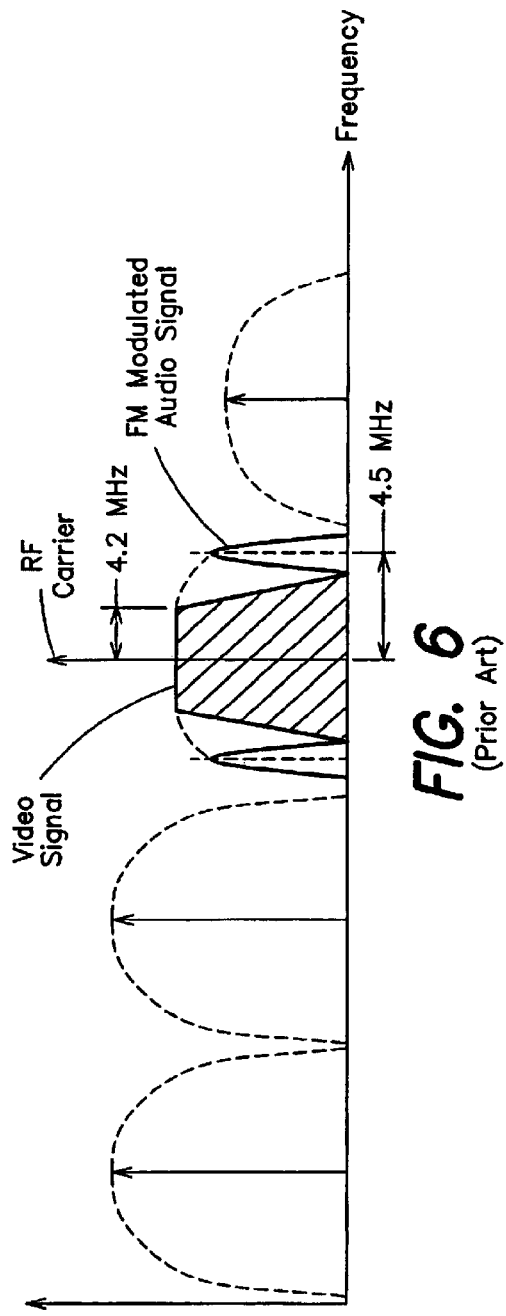
FIG. 6 is a graphical representation of a signal frequency spectrum of an RF modulated video and audio signal.
Figure 7:
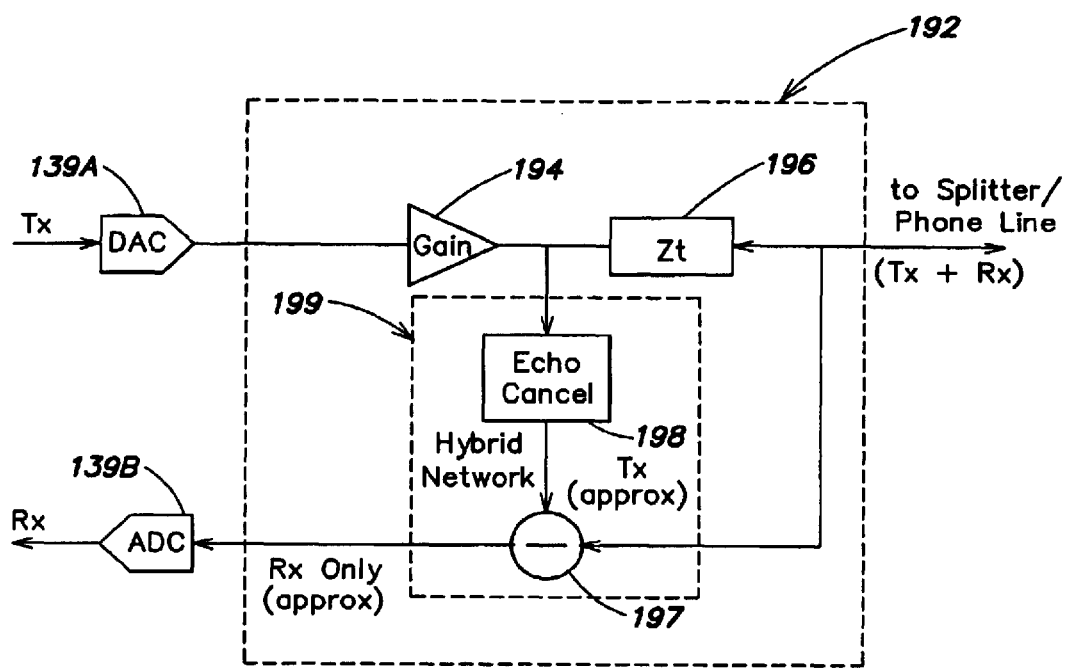
FIG. 7 is a schematic block diagram of a prior art analog front end used in the communication system of FIG. 3.
Figure 8:
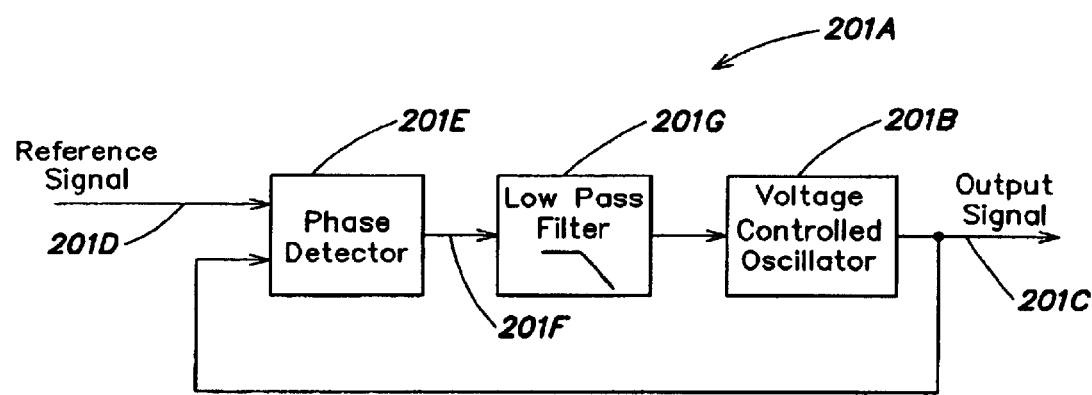
FIG. 8 is a schematic block diagram of a prior art phase locked loop.
Figure 9:
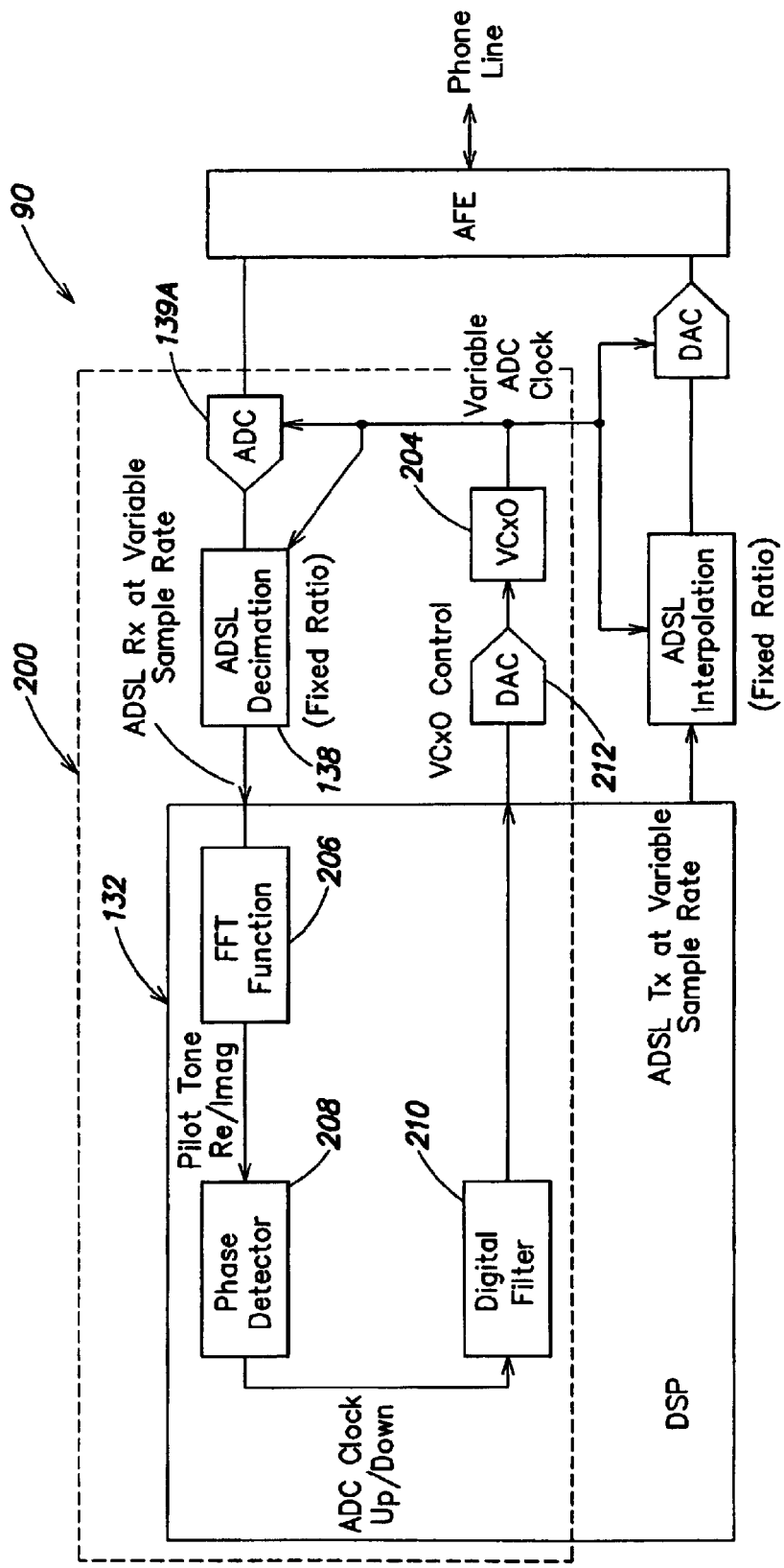
FIG. 9 is a schematic block diagram of a prior art portion of the ADSL signal path of the communication system of FIG. 3, showing a prior art phase locked loop.

In should be noted that one difference between the sample rate based PLL 600 illustrated in FIG. 17 and the prior art PLL of FIG. 9 is that in the PLL of FIG. 17, the ADC 606 is removed from the control loop of the PLL 600. In some embodiments, removing the ADC from the control loop and employing the digital control loop may help reduce phase noise. However, reducing phase noise is not a requirement of the invention.

As to the transmit side of the device 602, the DSP 620 supplies a data stream having a variable sample rate to an interpolation filter 622, e.g., an ADSL interpolation filter, that further receives the sample rate control signal 612 and in response thereto, applies variable ratio interpolation to generate a sampled data stream having a fixed sample rate. The sampled data stream is supplied to a DAC, which is coupled to the combined AFE 604 and the communication link 322.

In one embodiment, the DAC comprises a sigma delta converter, and as with the ADC 606, is supplied with a fixed rate clock, e.g., 8.192 megahertz (MHz).

In one embodiment of the ADSL decimation filter, the input sample rate is 8.192 MHz and the output sample rate is 2.208 MHz+/−400 ppm or 1.104 MHz+/−400 ppm in increments of 0.048 ppm. In one embodiment of the interpolation filter, the input sample rate is 1.104 MHz+/−400 ppm or 552 KHz+/−400 ppm and the output sample rate is 8.192 MHz.

Figure 18:
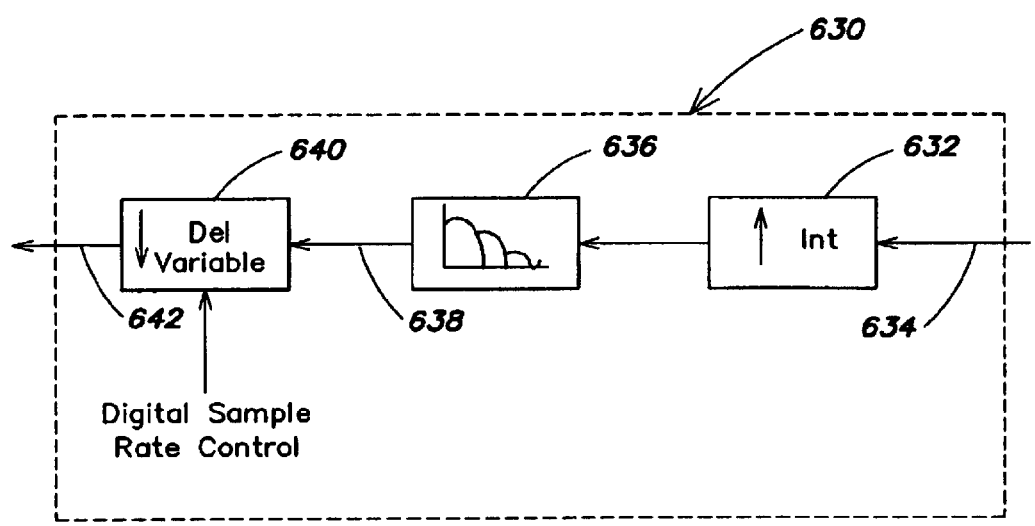
FIG. 18 is a schematic block diagram representation of a sample rate controllable digital filter according to another embodiment of a third aspect of the present invention, which for example, may be used in the phase locked loop of FIG. 17.

FIG. 18 is a representation of one embodiment of a digital filter 630 having a controllable output sample rate, which may for example be used in the sample rate conversion based PLL of FIG. 17. The digital filter 630 includes an interpolation portion 632 having an input that receives a sampled data stream via signal line 634. The received sampled data stream has a first sample rate. The interpolation portion 632 outputs a data stream having a second sample rate that is a fixed multiple higher than that of the sampled data stream input to the interpolation portion 632. The sampled data stream out of interpolation portion 632 is supplied to a filter portion 636 which provides digital filtering and outputs a filtered data stream on signal line 638.

The filtered data stream has the same sample rate as that of the sampled data stream into the filter portion 636. The filtered data stream is supplied to a decimation portion 640. The decimation portion further receives a digital sample rate control signal, and in response thereto, outputs a data stream on signal line 642 having a lower sample rate than that of the data stream into the decimation portion 640. The amount of the decimation provided by the decimation portion 640 is variable and responsive to the sample rate control signal. Equation 1 is a numerical representation of the operation of the digital filter in this embodiment:

$$\text{sample rate out} = (\text{sample rate in})(\text{interpolation})/(\text{decimation}) \quad \text{eq.1}$$

where the decimation is a variable based on the sample rate control signal.

Any criteria may be used to control the sample rate. The criteria may be predetermined or may be determined dynamically. The criteria may be embodied in software, hardware, firmware, or any combination thereof. Further, the criteria may be implemented in any form including, but not limited to rules, processes, functions, formulas, equations, look up tables, mappings, etc., or any combination thereof.

The interpolation portion 632, the filter portion 636, and the decimation portion 640 may employ any type of digital filter methods. In one embodiment of the interpolation portion of the digital filter, for example, the interpolation portion carries out interpolation by adding zeros, i.e., interpolation by a factor of x is carried out by adding (x−1) zeros. In one embodiment of the filter portion of the digital filter, the filter portion comprises a FIR type low pass digital filter that removes images that may result from the interpolation. In one embodiment of the decimation portion of the digital filter, the decimation portion carries out decimation by "discarding" values in a periodic manner, e.g., discarding d values from among a group of d+k, where k signifies keep values. This results in an average rate out of the decimation portion. For example if one out of two values are discarded (i.e., d=1, d+k=2), the following discard/keep sequences for successive time intervals may be used:

d, k, d, k, d, k, d, k, . . .

It should be understood that the sample rate out of the digital filter may be, but need not be, an integer multiple or an integer division of the sample rate into the digital filter.

In another embodiment, the amount of the decimation provided by the decimation portion is fixed and the amount of the interpolation provided by the interpolation portion is variable and responsive to the sample rate control signal.

In one embodiment, the decimation portion of the digital filter may comprise a plurality of stages.

Figure 19:
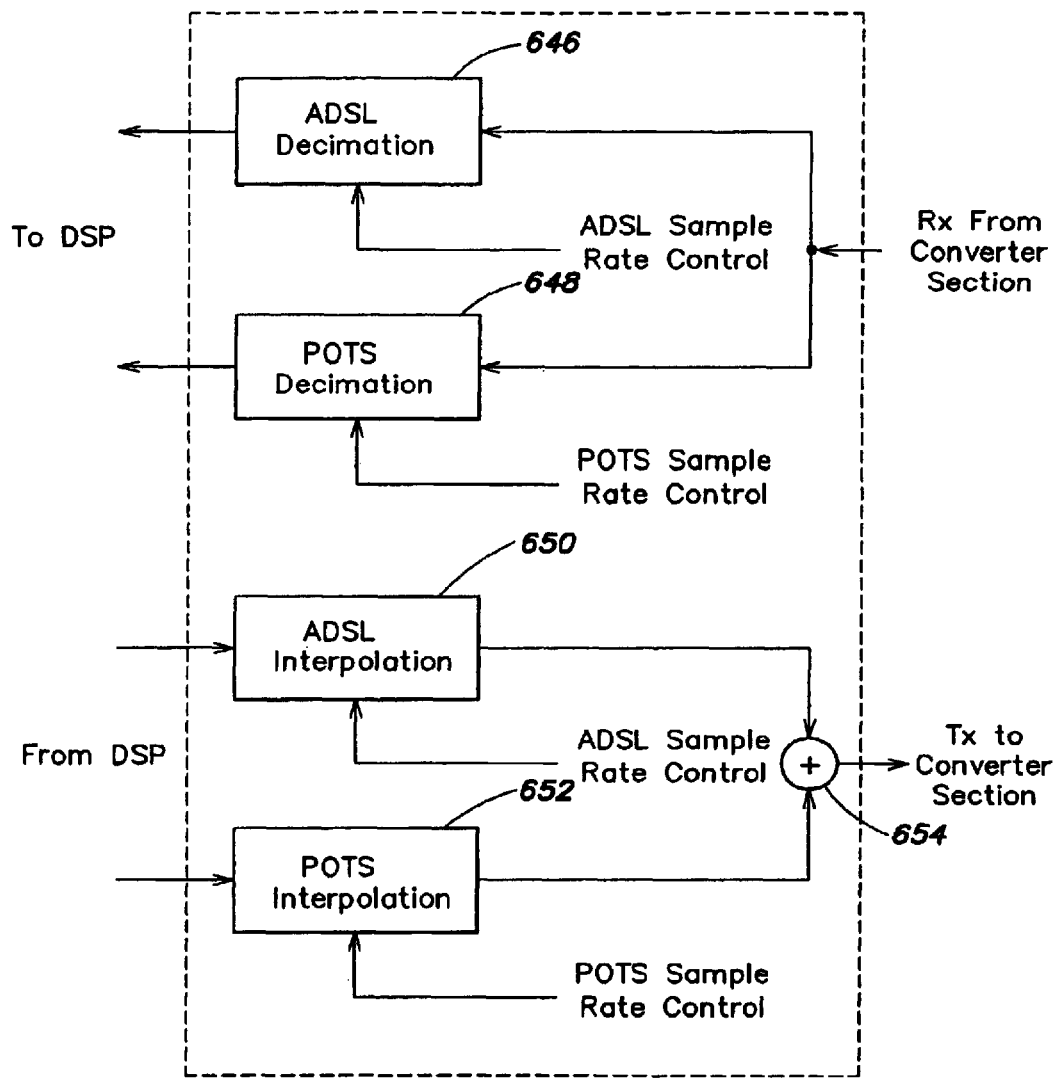
FIG. 19 is a schematic block diagram representation of one embodiment of the digital filter section of the communication system of FIG. 12A.

FIG. 19 illustrates one embodiment of the digital filter section 366 illustrated in FIG. 12A. Referring now to FIG. 19, the digital filter includes an ADSL decimation filter 646, a POTS decimation filter 648, an ADSL interpolation filter 650, and a POTS interpolation filter 652, all of which are sample rate controllable. The ADSL decimation filter 646 and the ADSL interpolation filter 650 each receive an ADSL sample rate control signal. The POTS decimation filter 648 and the POTS interpolation filter 652 each receive a POTS sample rate control signal.

The ADSL decimation filter 646 and the POTS decimation filter 648 each receive the sampled data stream from the ADC, and each outputs a separate data stream that may be supplied to the DSP. In one embodiment, the input sample rate to the ADSL decimation filter 646 and the POTS decimation filter 648 is 8.192 MHz, the output sample rate of the ADSL decimation filter 646 is 2.208 MHz+/−400 ppm or 1.104 MHz+/−400 ppm in increments of 0.048 ppm, and the output sample rate of the POTS decimation filter 648 is in a range between 7 kHz and 14 kHz, controllable in increments of 1 Hz. In one embodiment, the ADSL decimation filter 646 does not filter out the POTS component, but rather, the POTS component is removed, if necessary, by a filtering algorithm executed by the DSP.

The ADSL interpolation filter 650 and the POTS interpolation filter 650 receive an ADSL sampled data stream and a POTS sampled data stream, respectively. The ADSL interpolation filter 650 and the POTS interpolation filter 652 each outputs a separate data stream, which are combined 654 into a single data stream. In one embodiment, the input sample rate to the ADSL interpolation filter 650 is 1.104 MHz+/−400 ppm or 552 KHz+/−400 ppm, the input sample rate to the POTS interpolation filter 652 is in a range between 7 kHz and 14 kHz, controllable in increments of 1 Hz, and the output sample rate of each of the interpolation filters is 8.192 MHz. In some embodiments, the sample rate out of the ADSL interpolation filter 650 may not be equal to the sample rate out of the POTS interpolation filter 652, however, in such embodiments, it may be desirable to make one of the sample rates an integer multiple of the other of the sample rates.

Figure 20A:
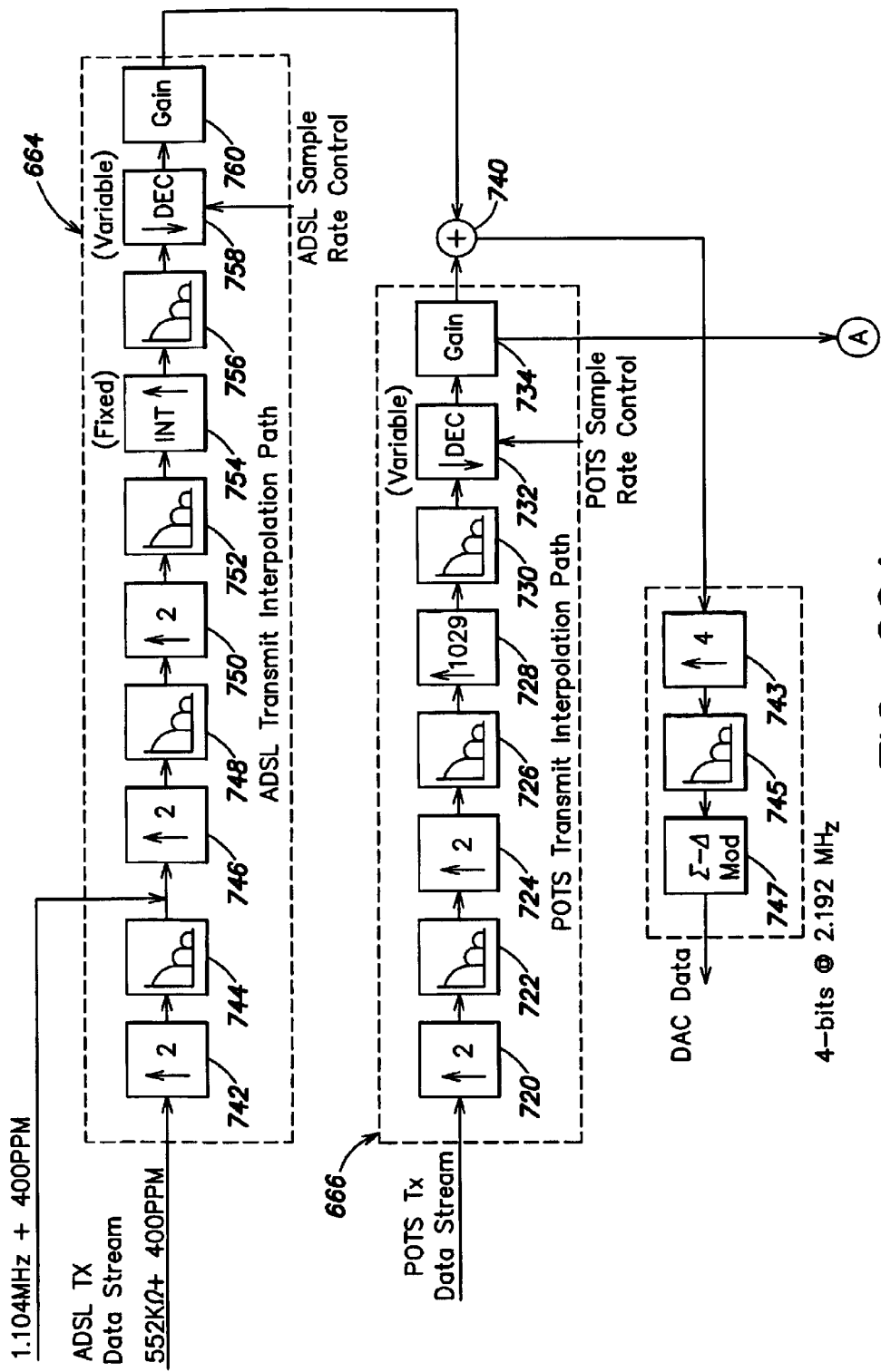
FIG. 20A and FIG. 20B are a schematic block diagram representation of another embodiment of the digital filter section of the communication system of FIG. 12A.
Figure 20B:
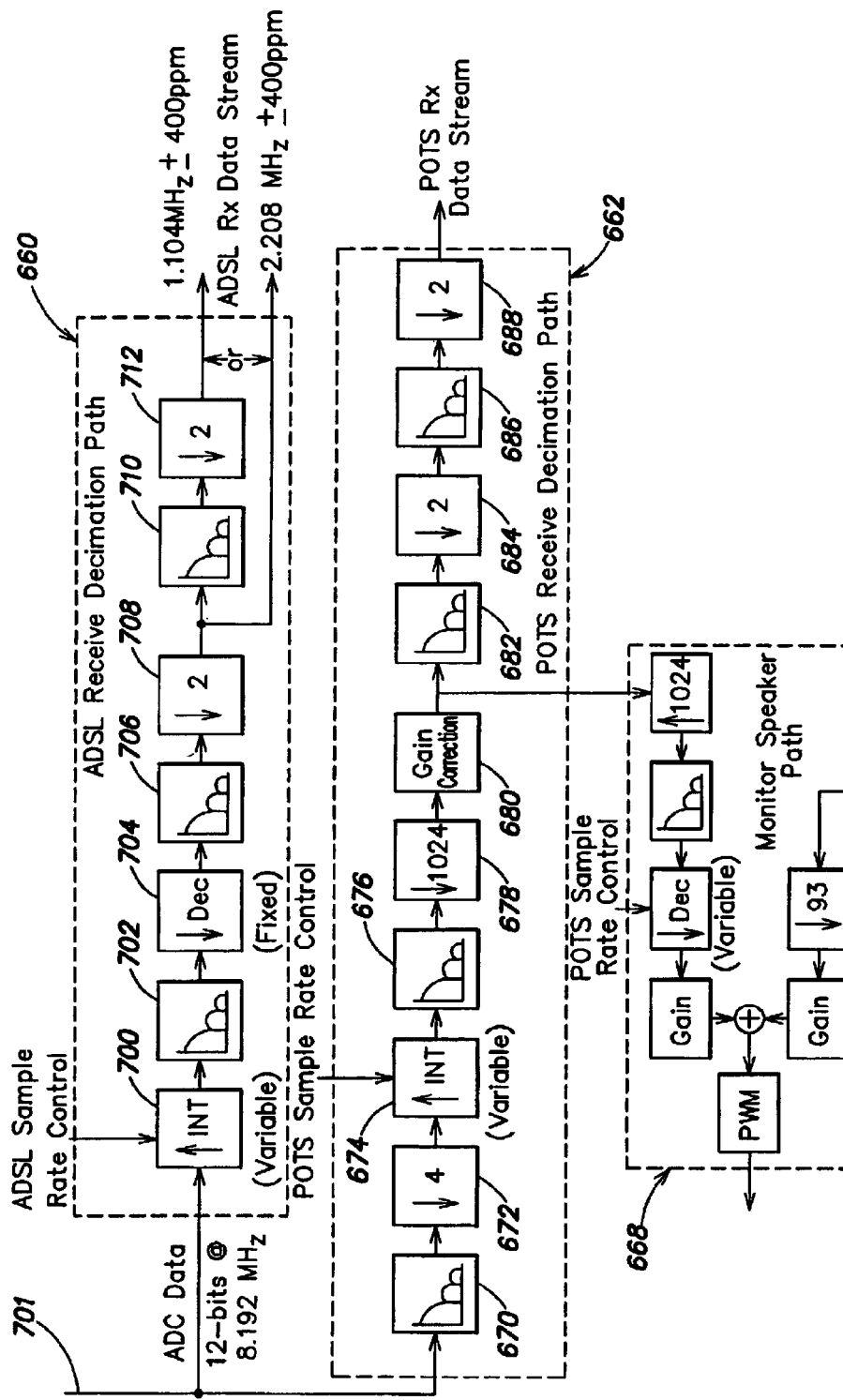

FIG. 20 illustrates another embodiment of the digital filter section of FIG. 12A. Referring now to FIG. 20, the digital filter section includes an ADSL decimation filter 660, a POTS decimation filter 662, an ADSL interpolation filter 664, and a POTS interpolation filter 666, all of which are sample rate controllable. The ADSL decimation filter 660 and the ADSL interpolation filter 664 each receive an ADSL sample rate control signal. The POTS decimation filter 662 and the POTS interpolation filter 666 each receive a POTS sample rate control signal.

In some embodiments, an additional monitor speaker path 668 is provided to allow components of the POTS Rx and Tx signals to be output on a monitor speaker channel. The channel allows the user to monitor the progress of a POTS call for debug purposes.

The POTS Receive Decimation Filter 662 has a digital filter 670 that receives the sampled data stream (e.g., having a fixed sample rate of 8.192 MHz), via a signal line 671, from the ADC. The digital filter 670 outputs a sampled data stream, which is supplied to a decimator 672 having a fixed decimation ratio of 4. The output from the decimator 672 is input to an interpolator 674 having a variable interpolation ratio the value of which is controlled by the POTS Sample Rate control signal. The output of the interpolator 674 is a variable rate data stream, which is input to a digital filter 676 in series with a decimator 678 having a fixed decimation ratio of 1024. The decimator 678 outputs a sampled data stream, which is input to a gain correction block 680. The gain correction block 680 allows the POTS Receive signal level to be controlled by the user and corrects for gain errors that were introduced by the variable interpolation block 674. The output from the gain correction block 680 is supplied to one input (i.e., a POTS Receive Decimation path input) of the Monitor Speaker path 668. The output of the gain correction block 680 is also supplied to a digital filter 682 followed by a decimator 684 having a fixed decimation ratio of 2. The decimator 684 outputs a sampled data stream that is supplied to another digital filter 686 followed by a decimator 688 having a fixed decimation ratio of 2. The output of the decimator 688 is the POTS Receive data stream having a variable sample rate of 7 kHz to 14 kHz.

The ADSL Receive Decimation Filter 660 has a variable interpolation function 700 that receives the sampled data stream (e.g., having a fixed sample rate of 8.192 MHz), via a signal line 701, from the ADC. The variable interpolation 700 is controlled by the ADSL Sample Rate control signal. The variable interpolation function 700 outputs a sampled data stream having a variable sample rate, which is supplied to a digital filter 702. The output from the digital filter 702 is supplied to decimator 704 having a fixed decimation ratio. The output of the decimator 704 is supplied to another digital filter function 706 followed by a another decimator 708 having a fixed decimation ratio of 2. The decimator 708 outputs a data stream having a variable sample rate of 2.208 MHz+/−400 ppm. This variable sample rate data stream is input to a filter 710 in series with a decimator 712 that decimates by a factor of two to produce a sampled data stream having a variable sample rate of 1.104 MHz+/−400 ppm. In this embodiment, either the 1.104 MHz+/−400 ppm data stream or the 2.208 MHz+/−400 ppm data stream is supplied to the DSP as the ADSL Receive Data Stream.

The POTS Transmit Interpolation Filter Path has an interpolator 720 that receives a variable sample rate data stream from the DSP. The variable rate data stream has a sample rate that can vary from 7 kHz to 14 kHz in 1 Hz increments. The interpolator 720 applies a fixed interpolation ratio of 2, and outputs a sampled data stream which is supplied to a digital filter 722 that is in series with an interpolator 724 having a fixed interpolation ratio of 2. The output of the interpolator 724 is supplied to a digital filter 726. The output of the digital filter is input to an interpolator 728 that has a fixed interpolation ratio of 1024 and is in series with a digital filter 730. The output from this digital filter 730 is a variable rate data stream, which is input to a decimator 732 having a variable decimation ratio. This variable decimation ratio is controlled by the POTS Sample Rate control signal. The decimation filter 732 outputs a data stream having a fixed sample rate of 2.048 MHz. This data stream is supplied to a gain block 734 that allows the POTS Transmit signal level to be adjusted by the user. The output from the gain block 734 is supplied to one input (e.g., a POTS Transmit Interpolation Path input) of the Monitor Speaker path. The output from the gain block 734 is further supplied to a summing block 740 in the ADSL Transmit Interpolation Path.

The ADSL Transmit Interpolation Filter 664 has an input that receives a variable sample rate data stream from the DSP. In this embodiment, the variable sample rate data stream has a sample rate of 552 kHz+/−400 ppm or a sample rate of 1.104 MHz+/−400 ppm sample stream. If the sample rate is 552 kHz+/−400 ppm, the variable rate data stream is input to an interpolator 742, which has a fixed interpolation value of two. The interpolator outputs a data stream, which is supplied to a digital filter function 744. The output of the digital filter is a data stream having a variable sample rate of 1.104+/−400 ppm. This data stream is input to an interpolator 746 having a fixed interpolation value of 2. On the other hand, if the sample rate of the variable sample rate data stream from the DSP is 1.104 MHz+/−400 ppm, then the variable rate data stream from the DSP is input directly to the interpolator 746, thereby bypassing the interpolator 742 and digital filter 744. The interpolator 746 outputs a sampled data stream that is supplied to a digital filter 748. The output from this filter 748 is input to another interpolator 750 with a fixed interpolation value of 2 in series with a digital filter 752. The output from the digital filter 752 is input to an interpolator 754 having a fixed interpolation value of $2^{23}$. The interpolator 754 supplies a digital filter 756, which outputs a data stream having a variable sample rate. The variable sample rate data stream is input to a decimator 758 having a variable decimation ratio. This decimation ratio is controlled by the ADSL Sample Rate control signal. The output from the decimator 758 is a data stream having a fixed sample rate of 2.048 MHz, which is input to a Gain block 760 that allows the signal to be adjusted under user control. The output from this gain block 760 is a fixed sample rate representation of the ADSL Transmit signal. This signal is supplied to the summing block 740, which sums the data stream with the 2.048 MHz fixed sample rate output from the POTS Interpolation Path. The output from the summing block 740 is input to an interpolator 743 with a fixed interpolation ratio of 4. The output from the interpolator 743 is input to a digital filter 745 the output of which is a data stream having a fixed sample rate of 8.192 MHz. This data stream is input to the digital sigma-delta modulator 747 to produce the 4-bit DAC data stream having a fixed sample rate of 8.192 MHz.

The Monitor Speaker path has two data stream inputs. These inputs come from the POTS Transmit Interpolation Path and the POTS Receive Decimation Path. The Input from the POTS Transmit Interpolation Path is input to a decimator with a fixed decimation ratio of 93. The output from this decimator is input to a gain block. This allows the POTS Transmit contribution to the Monitor Speaker path to be adjusted by the user. The output from this gain block is a data stream with a fixed sample rate of 22.021 kHz and goes to a first input of the Monitor Speaker path summing function. The input from the POTS Receive Decimation Path is input to an interpolator with a fixed interpolation ratio of 1024. This is followed by a digital filter and a decimator with a variable decimation ratio which is controlled by the POTS Sample Rate control signal. The output from this decimator is input to a gain block. This allows the POTS Receive contribution to the Monitor Speaker path to be adjusted by the user. The output from this gain block is a data stream with a fixed sample rate of 22.021 kHz and goes to a second input of the Monitor Speaker path summing function. The output from the summing function is input to a PWM block which generates a PWM output stream that may be input to a PWM DAC.

Thus, it is possible, but not required, to take data streams having sample rates unrelated to one another, to use sample rate conversion to produce data streams having sample rates compatible to one another, e.g., equal to or multiples of one another, and to combine the data streams and feed the data streams into a single DAC.

In some embodiments, the analog section includes an analog filter (not shown) to filter the analog signal from the converter.

Signal transformers, such as those that may be used in an isolation barrier, can be a source of performance degradation. Placing the isolation barrier on the digital side of the signal path, as in the device of FIG. 12A, may help make it possible to realize an isolation barrier that does not employ a transformer, and thereby may help eliminate the degradation associated with a transformer, which may make it possible to improve performance of the analog portion of the signal path.

Figure 21:
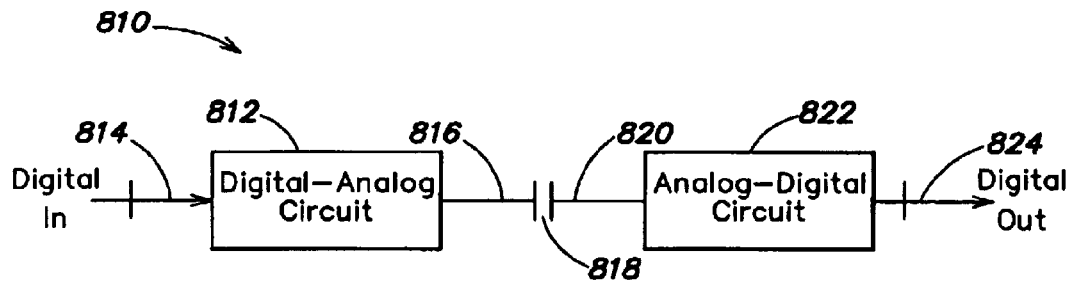
FIG. 21 is a schematic block diagram of one embodiment of the isolation barrier in the device of FIG. 12A.

FIG. 21 shows one embodiment of an isolation barrier that may be used in the device of FIG. 12A. The isolation barrier includes a digital to analog circuit 812 which receives the digital input at 814 and converts it to an analog output at 816. The analog output 816 is transferred across the isolation barrier 818 shown here simply as a single capacitor for illustrative purposes. The analog signal on the output 820 of isolation barrier 818 is delivered to analog to digital circuit 822 where it is converted back to a digital signal to provide the digital output at 824. The digital input and thus the digital output may be data or control signals or a mixture of both. In addition, throughout this description, although various schematics are shown in single line format the system may be implemented in a single ended mode or in a differential mode.

Figure 22:
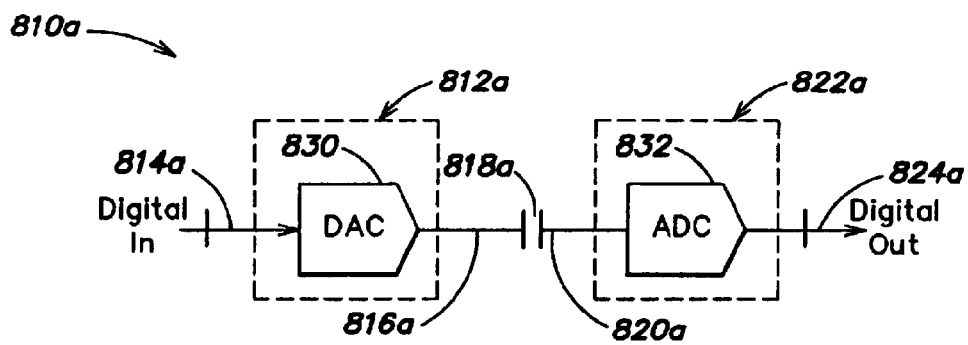
FIG. 22 is a schematic block diagram of another embodiment of the isolation barrier in the device of FIG. 12A.

In one embodiment, digital to analog circuit 812a, (FIG. 22) may be implemented simply with a digital to analog converter 830 and analog to digital circuit 822a may be implemented simply with an analog to digital converter 832. Both system 810 and 810a (FIGS. 21 and 22) are shown as unidirectional devices but the invention applies as well to bi-directional devices as will be explained hereinafter with respect to FIG. 29.

Figure 23:
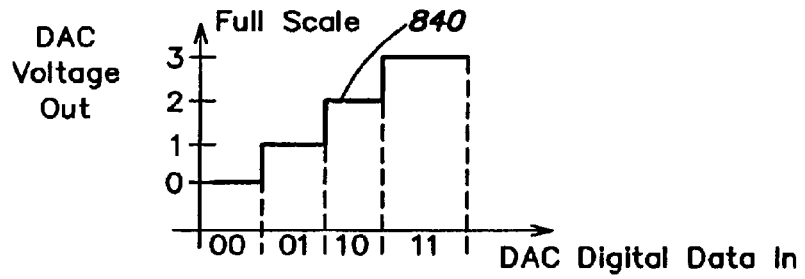
FIG. 23 illustrates the transfer function of the digital to analog converter of the isolation barrier of FIG. 22.
Figure 24:
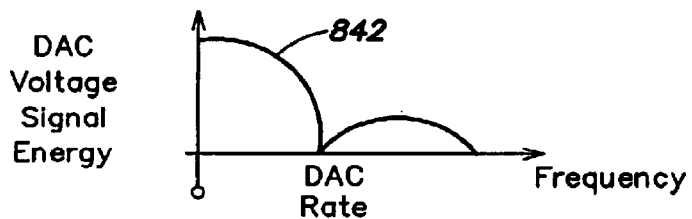
FIG. 24 illustrates the frequency spectrum of the DAC output of the isolation barrier of FIG. 22.
Figure 25:
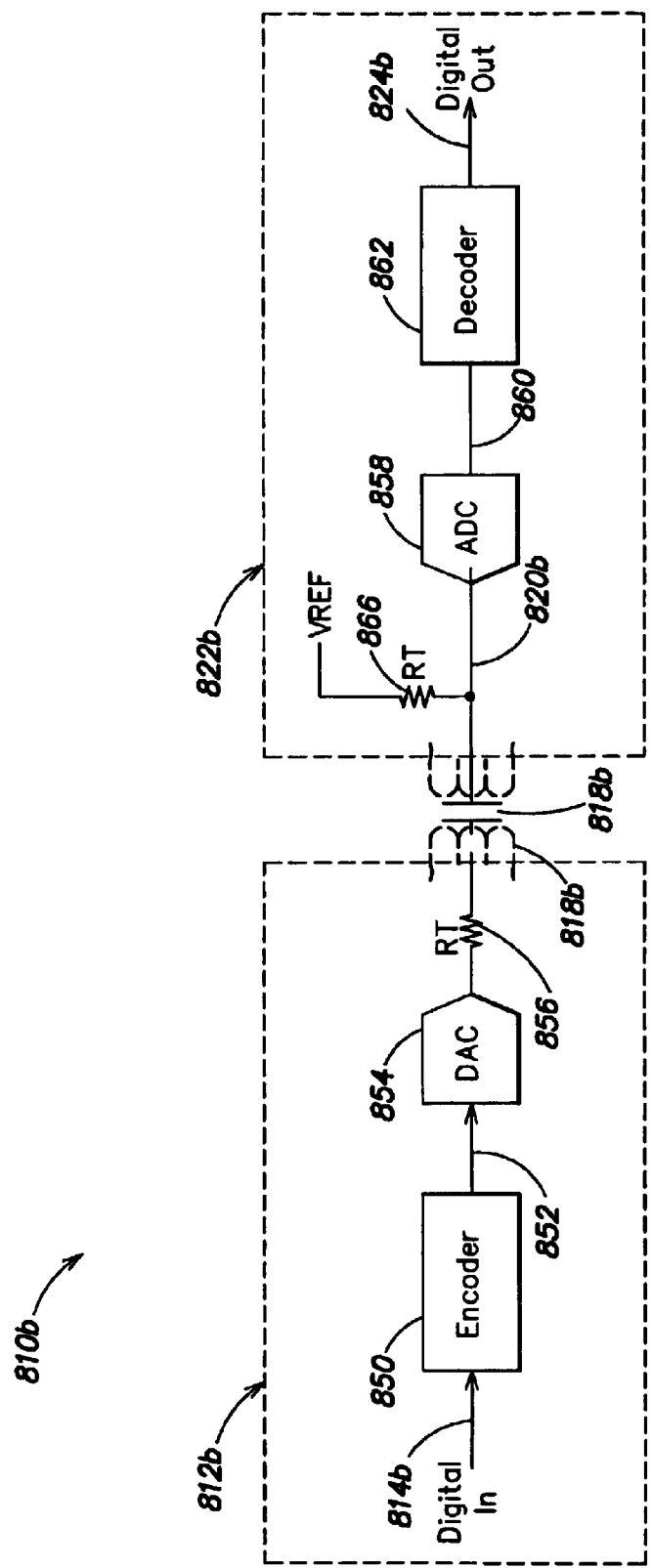
FIG. 25 is a schematic block diagram of another embodiment of the isolation barrier in the device of FIG. 12A.

The transfer function 840, (FIG. 23) of DAC 830 shows DC voltages of 0, 1, 2 and 3 for the digital inputs of 00, 01, 10 and 11. When the simple straight forward implementation of DAC 830 is used a problem can occur because the signal level may remain steady when the particular digital input value remains unchanged for a number of contiguous clock pulses. Thus, if the digital value 01 was transmitted for three or four clock cycles or more, there would be no change in the voltage level and there would be a loss of signal across the capacitor 818 of the isolation barrier which cannot pass or transmit DC levels. The frequency spectrum of DAC 830 appears as shown at 842 (FIG. 24) where it can be seen that most of the energy is concentrated at lower frequencies which are blocked by the capacitor. To improve the performance it is desired to have a system that effects the signal transmitted across the isolation barrier so that it has a constant average signal in the nature of a periodic signal so that it passes normally through a capacitive or transformer coupling. One implementation to address this problem is shown in FIG. 25 where digital to analog circuit 812b includes an encoder 850 that receives the digital input at 814b and delivers such a constant average signal to the input 852 of DAC 854. A termination resistor 856 has also been added to affect common mode rejection. Since this is a unidirectional embodiment termination resistance 856 is not actually required. Analog to digital circuit 822b includes an analog to digital converter 858 which senses the constant signal average output 820b from isolation barrier 818b, converts it to a digital signal, and delivers it to decoder 862. Decoder 862 then provides the digital output on line 824b. Analog to digital circuit 822b also includes a termination resistance 866 to reduce common mode errors. Common mode rejection or reduction is accomplished because any common mode signal that occurs across resistance 856 will be suppressed through resistance 866 and $V_{ref}$ so that the input 820b to ADC 858 can be kept at its proper level. The isolation circuit need not be capacitive. It could as well be a transformer as shown at 818b.

Figure 26:
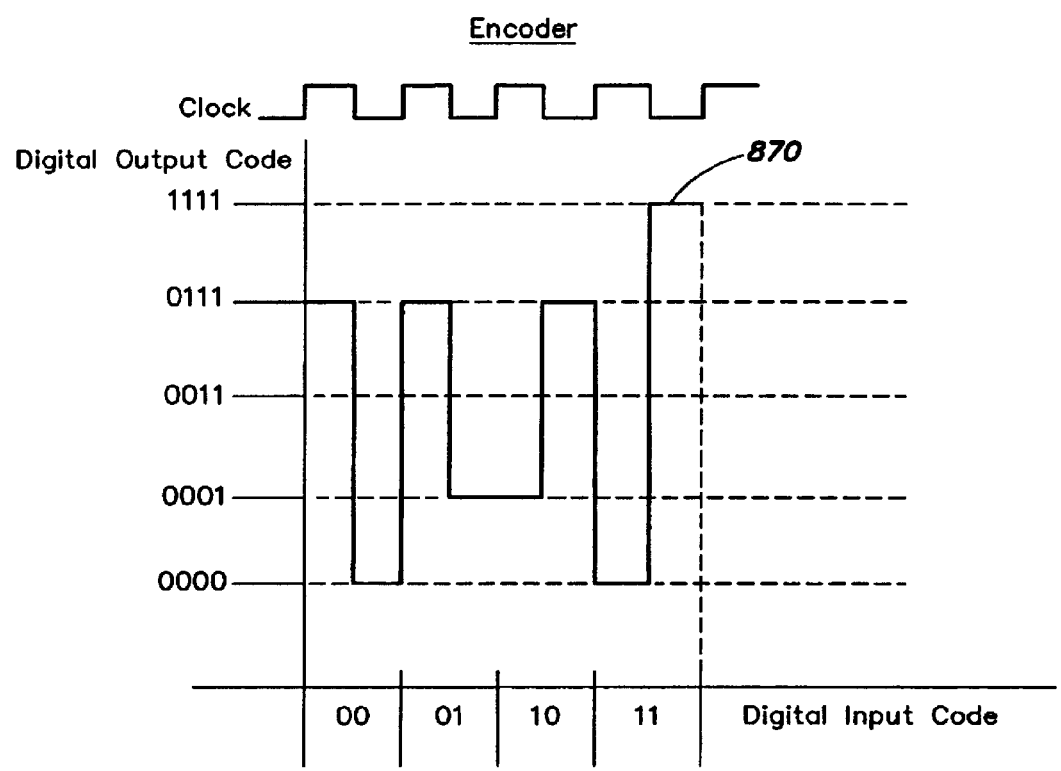
FIG. 26 illustrates the transfer function of the encoder of the isolation barrier of FIG. 25.
Figure 27:
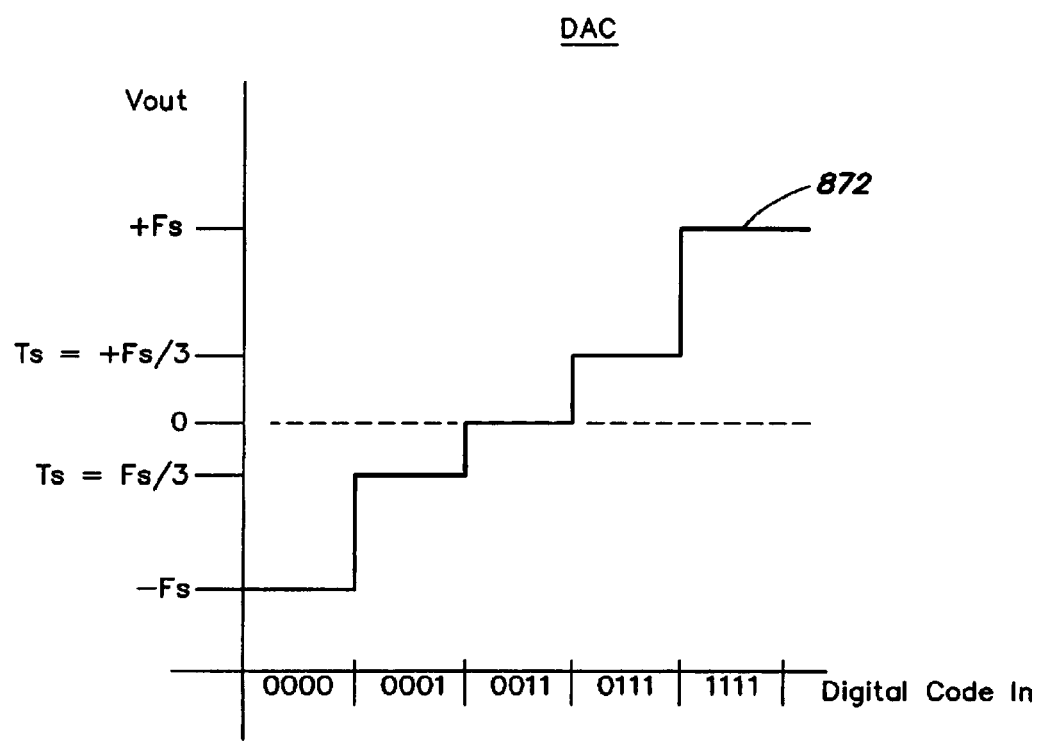
FIG. 27 illustrates the transfer function of the digital to analog converter of the isolation barrier of FIG. 25.
Figure 28:
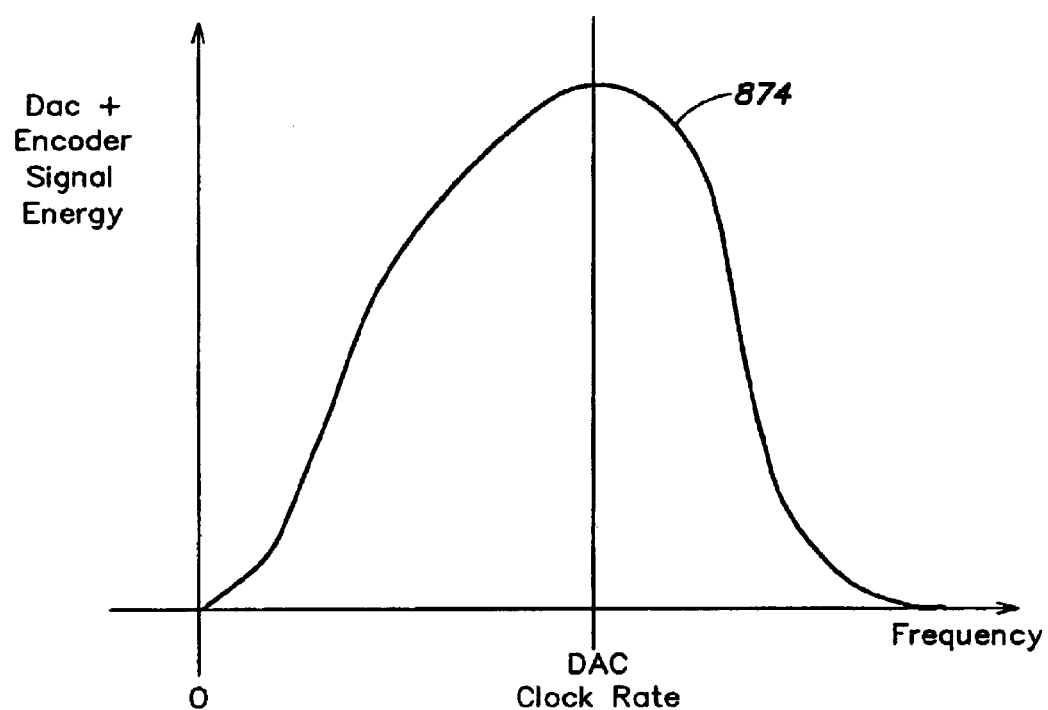
FIG. 28 illustrates the frequency spectrum of the digital to analog converter of the isolation barrier of FIG. 25 provided with the input from the encoder of the isolation barrier of FIG. 25.

Encoder 850 has a transfer function 870, (FIG. 26) which has a constant average. For example, the digital input codes 00, 01, 10 and 11 produce the encoded output signal 870 as follows: input code 00 is represented by a change of digital output code 4 "1's" 1111 to 0000. Digital input code 01 is represented by a change of output code from 0111 to 0001. Digital input code 10 is represented by a change in digital output code from 0001 to 0111. Digital input code 11 is represented by the digital output code changing 0000 to 1111. The average of all these codes is the digital output code of 0011 which is the maximum digital output code 1111 divided by 2. When these code transitions are delivered to DAC 854, they produce voltage levels as shown in FIG. 27 with respect to transfer function 872. There it can be seen that the center or constant average at 0 is centered between third scale (+TS) and third scale (−TS) and +full scale (+FS) and −full scale (−FS). The digital output code derived from encoder 850 then is represented by the levels as shown in FIG. 27. Thus digital output code 0000 is represented by −FS; 0001 by −TS; 0011 by 0; 0111 by +TS and 111 by +FS. This results in a much improved frequency distribution for the output of the DAC as shown in FIG. 28 where its characteristic 874 can be seen as gaussian in nature and not concentrated at the low frequency end of the spectrum. This makes it ideally suited for transmission through the isolation barrier implemented by capacitive or transformed elements.

Figure 29:
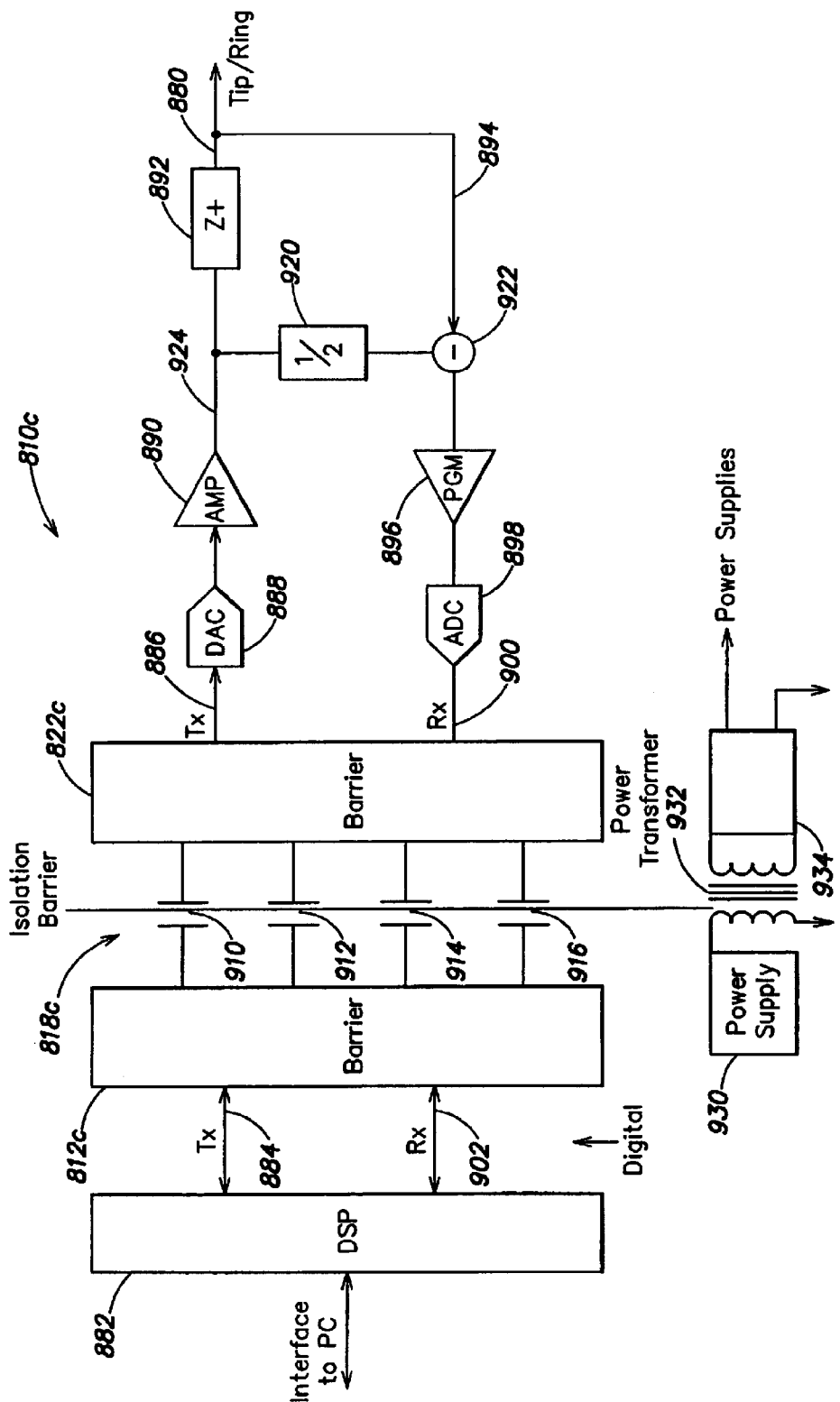
FIG. 29 is a schematic block diagram of a bi-directional digital isolation system in an ADSL/POTS typical telephone arrangement.

In one embodiment, the isolation system 810c, FIG. 29, is incorporated in a typical telephone system between the tip and ring line 880 and associated circuitry and a digital signal processor (DSP) 882 which may, for example, interface with a personal computer or other device. In this implementation barrier interface circuit 812c, isolation barrier 818c, and barrier interface circuit 822c are bi-directional. Thus, the digital signal processor 882 delivers a signal $T_x$ on line 884 to barrier interface circuit 812c which is passed through isolation barrier 818c to barrier interface circuit 822c. The transmitted signal $T_x$ appears on line 886 where it is submitted to a digital to analog converter 888. The analog signal is amplified in amplifier 890 and passed through termination impedance 892 to the output at 880 of the tip and ring line. Received signals also appearing on tip and ring line 880 are delivered on line 894 through amplifier 896 to analog to digital converter 898 which delivers the received signal $R_x$ on line 900 to barrier interface circuit 822c. The received signal $R_x$ is transmitted across isolation barrier 818c to the input of barrier interface circuit 812c from which the received signal $R_x$ appearing on line 902 is delivered to the digital signal processor 882 or other equipment. Barrier interface 812c and barrier interface 822c each include an analog to digital circuit and a digital to analog circuit since they transmit and receive bi-directionally through isolation barrier 818c, which is indicated by the presence of a number of capacitors 910, 912, 914, and 916. There are a number of channels and each of them has an analog to digital circuit and digital to analog circuit associated with it. Local echo cancellation is achieved by divider circuit 920 and summing circuit 922. The transmit signal on line 924 is halved in divider circuit 920 and then subtracted from the echoed signal on line 894 in summing circuit 922 so that the received signal on line 894 when submitted to amplifier 896 is essentially free of the local echo or reflection of the transmit signal on line 924 coming from DAC 888. Power may be supplied from a suitable power supply through power supply 930, through power transformer 932, and distributor circuit 934.

Figure 30:
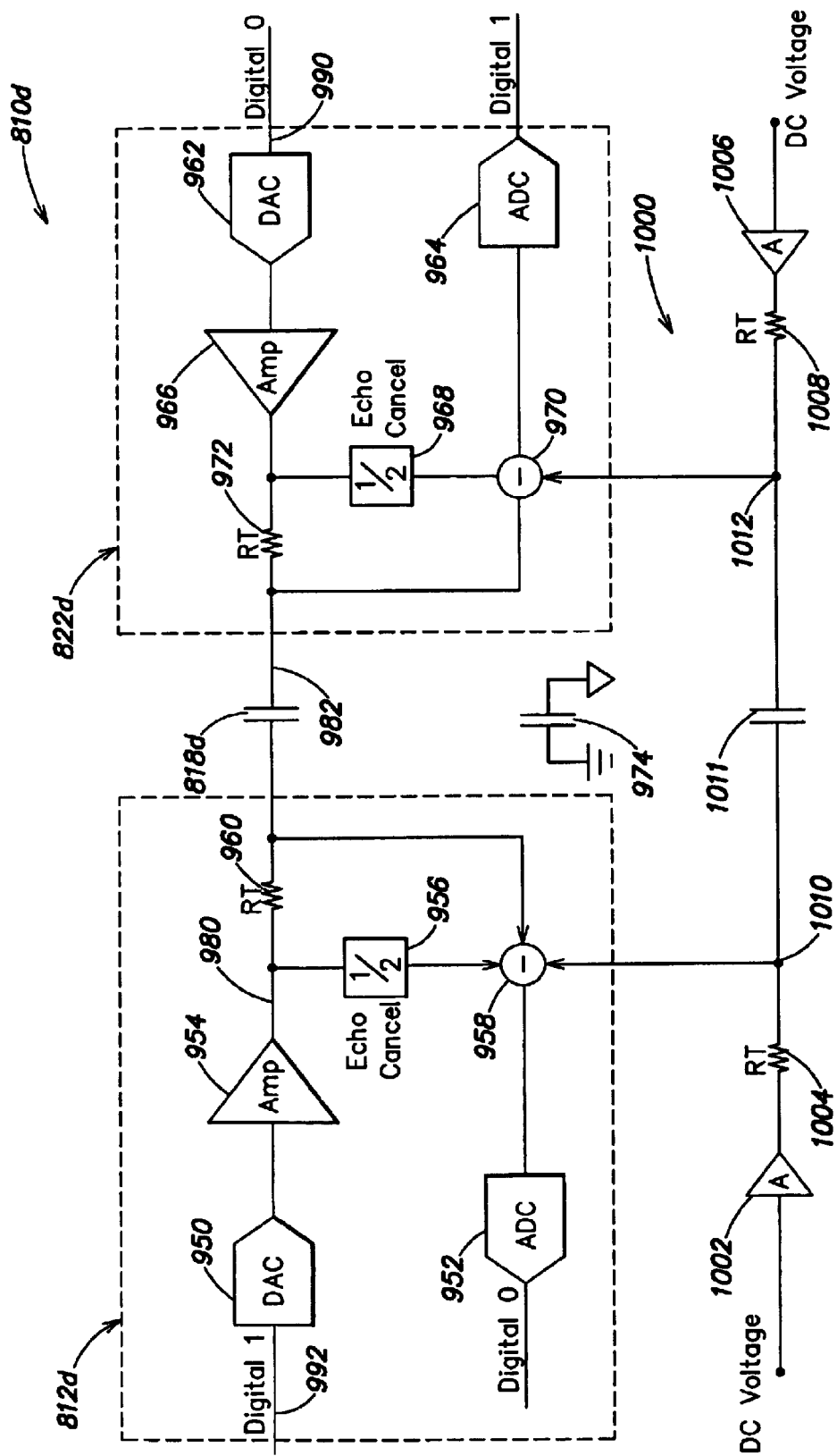
FIG. 30 is a schematic block diagram of a part of the bi-directional digital isolation system of FIG. 29 with additional common mode rejection.

Isolation system 810d of FIG. 30 includes additional common mode compensation. Since isolation system 810d is simultaneous bi-directional, digital to barrier interface circuit 812d includes a digital to analog converter 950 and an analog to digital converter 952 as well as an amplifier 954 and an echo cancellation circuit including divide by two circuit 956 and summing circuit 958. Also included is termination resistance 960. Similarly, barrier interface circuit 822d includes a digital to analog converter 962 and analog to digital converter 964. It also includes an amplifier 966 and an echo cancellation circuit including divide by two circuit 968 and summing circuit 970. Also included is termination resistance 972. A ground capacitor 974 is employed to provide a current return path for the signals being transmitted through isolation barrier 818d.

In the first instance, common mode rejection is effected through termination resistance 960 and 972. The effect of termination resistors 960 and 972 is to limit the voltage at 982 to a function of the digital voltage at input 990 plus that at input 992 divided by two. This significantly reduces the common mode interference by a factor of two. To further reduce the common mode interference, common mode rejection circuit 1000 may be employed. It consists of an amplifier 1002 and termination resistor 1004 on one side and a similar amplifier 1006 and termination resistance 1008 on the other side with an isolation capacitor 1011 between them. Amplifiers 1002 and 1006 are driven by a DC common mode signal. Any variation in that common mode signal is sensed at 1010 and 1012 respectively, and delivered to summing circuits 958 and 970, respectively, where they are subtracted from the incoming signal. This further reduces the common mode interference signals beyond what is accomplished by termination resistors 960 and 972 and isolation capacitor 818d.

Figure 31:
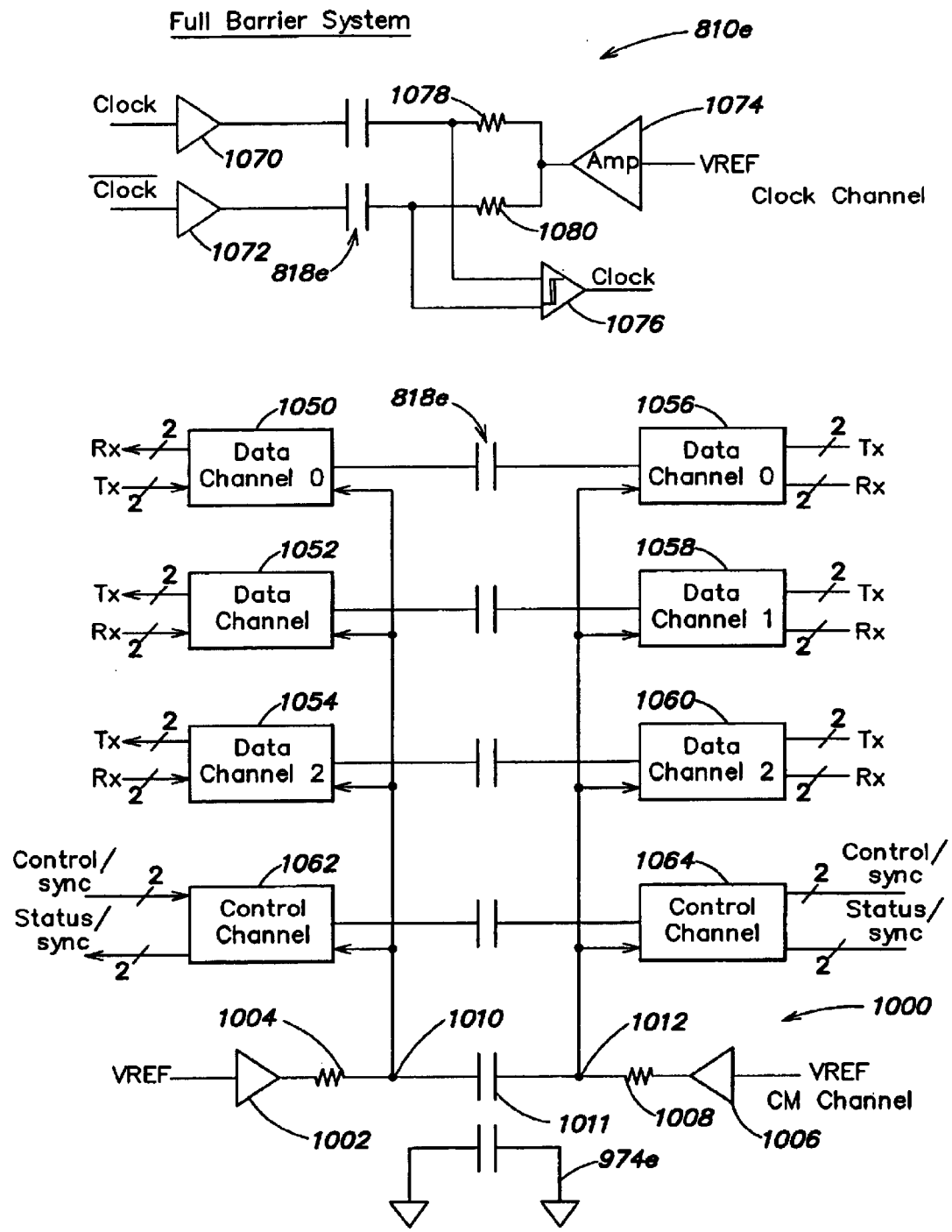
FIG. 31 is a schematic block diagram in greater detail of a full barrier isolation.
Figure 32:
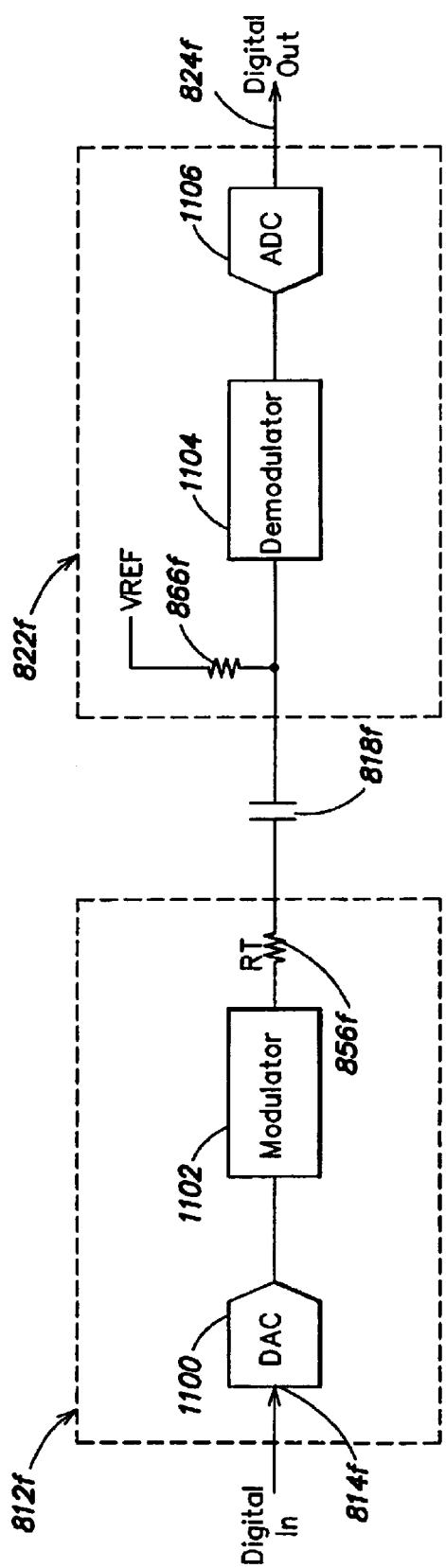
FIG. 32 is another embodiment of the isolation barrier in the device of FIG. 12A.

A more detailed embodiment is shown in FIG. 31 a number of data channels 1050, 1052, 1054, 1056, 1058 and 1060 for simultaneous bi-directional transmission and reception. Also included are bi-directional control channels 1062 and 1064 and common mode rejection circuit 1000 as well as ground capacitor 974e. A clock channel is also provided using amplifiers 1070 and 1072 to provide the clock and inverter clock signals respectively to a reference amplifier 1076. Resistance 1078 and 1080 are termination resistors that are in conjunction with the isolation capacitor 818e again provide common mode rejection or suppression. The isolation barrier is not limited to the embodiments shown in FIGS. 21–31. For example, as shown in FIG. 32, barrier interface circuit 812f may include a digital to analog converter 1100 which drives a modulator 1102 that provides the constant average signal through isolation barrier 818f to demodulator 1104 whose output is delivered to analog to digital converter 1106 in barrier interface circuit 822f and provides that digital output at 824f. Termination resistors 856f and 866f may be employed again to meet termination requirements and to suppress common mode errors.

Although disclosed above with respect to various embodiments for use with ADSL and POTS signal protocols, which occupy frequency bands that do not overlap one another, the different aspects of the present invention may also be used to support two or more protocols that occupy frequency bands that do overlap one another, at least in part.

While there have been shown and described various embodiments, it will be understood by those skilled in the art that the present invention is not limited to such embodiments and that various changes and modifications may be made.

What is claimed is:

1. A communication circuit communication circuit, comprising:
    an all-digital loop circuit configured to output a sample rate control signal to be a function of a frequency of a reference signal received by the communication circuit;
    a variable-ratio sample rate filter that changes a sample rate of an output digital data stream relative to a sample rate of an input digital data stream in response to the sample rate control signal received from the all-digital loop circuit;
    an analog-to-digital converter coupled to the variable-ratio sample rate filter; and
    a fixed clock coupled to the analog-to-digital converter to substantially fix a sampling rate of the analog-to-digital converter.

2. The communication circuit claimed in claim 1 wherein the variable-ratio sample rate filter comprises a digital decimation filter.

3. The communication circuit claimed in claim 2 wherein the decimation filter comprises an ADSL decimation filter.

4. The communication circuit claimed in claim 2 wherein the decimation filter comprises a POTS decimation filter.

5. The communication circuit claimed in claim 1 wherein the communication circuit further comprises a second variable-ratio sample rate filter, and a digital-to-analog converter coupled to both the second variable-ratio sample rate filter and the fixed clock to substantially fix a sampling rate of the digital-to-analog converter.

6. The communication circuit claimed in claim 5 wherein the variable-ratio sample rate filter comprises a decimation filter, and the second variable-ratio sample rate filter comprises an interpolation filter.

7. The communication circuit claimed in claim 6 wherein the decimation filter comprises an ADSL decimation filter and the interpolation filter comprises an ADSL interpolation filter.

8. The communication circuit claimed in claim 6 wherein the decimation filter comprises a POTS decimation filter and the interpolation filter comprises a POTS interpolation filter.

9. A communication circuit, comprising:
    an all-digital loop circuit configured to output a sample rate control signal to be a function of a frequency of a reference signal received by the communication circuit; and
    a variable-ratio sample rate filter that changes a sample rate of an output digital data stream relative to a sample rate of an input digital data stream in response to the sample rate control signal received from the all-digital loop circuit,
    wherein the reference signal comprises a pilot tone signal.

10. A communication circuit, comprising:
    an all-digital loop circuit configured to output a sample rate control signal to be a function of a frequency of a reference signal received by the communication circuit;
    a variable-ratio sample rate filter that changes a sample rate of an output digital data stream relative to a sample rate of an input digital data stream in response to the sample rate control signal received from the all-digital loop circuit;
    a digital-to-analog converter coupled to the variable-ratio sample rate filter; and
    a fixed clock coupled to the digital-to-analog converter to substantially fix a sampling rate of the digital-to-analog converter.

11. The communication circuit claimed in claim 10 wherein the variable-ratio sample rate filter comprises an interpolation filter, and the interpolation filter comprises an ADSL interpolation filter.

12. The communication circuit claimed in claim 10 wherein the variable-ratio sample rate filter comprises an interpolation filter, and the interpolation filter comprises a POTS interpolation filter.

* * * * *

UNITED STATES PATENT AND TRADEMARK OFFICE
CERTIFICATE OF CORRECTION

PATENT NO. : 6,996,200 B2  Page 1 of 1
APPLICATION NO. : 09/748700
DATED : February 7, 2006
INVENTOR(S) : Richard Schubert et al.

It is certified that error appears in the above-identified patent and that said Letters Patent is hereby corrected as shown below:

In claim 1, column 27, line 29, delete second occurrence of --communication circuit--.

Signed and Sealed this

Fourteenth Day of November, 2006

JON W. DUDAS
*Director of the United States Patent and Trademark Office*